United States Patent
Sanda et al.

(12) 
(10) Patent No.: US 6,205,060 B1
(45) Date of Patent: Mar. 20, 2001

(54) METHOD OF CONTROLLING A PRODUCTION PROCESS AND RECYCLE OF PHOTO FILM CARTRIDGE OR LENS-FITTED PHOTO FILM UNIT

(75) Inventors: Akihiro Sanda; Shoichi Uchida; Hiroshi Hara; Kazuhito Iwase, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/328,004

(22) Filed: Jun. 8, 1999

(30) Foreign Application Priority Data

| Jun. 9, 1998 | (JP) | 10-161130 |
| May 21, 1999 | (JP) | 11-141028 |
| Jun. 2, 1999 | (JP) | 11-154686 |
| Jun. 3, 1999 | (JP) | 11-156172 |

(51) Int. Cl.[7] .................................... G11C 7/00
(52) U.S. Cl. ........................ 365/189.04; 396/208
(58) Field of Search ............................ 365/244, 189.04; 396/208; 235/462.05; 364/468.18

(56) References Cited

U.S. PATENT DOCUMENTS

| 5,427,224 | 6/1995 | Suehara et al. ........................ 198/396 |
| 5,647,113 | 7/1997 | Hase et al. .......................... 29/407.05 |
| 5,659,491 | 8/1997 | Ichikawa et al. ................ 364/551.01 |
| 5,714,028 | 2/1998 | Horai et al. ............................ 156/212 |
| 5,815,911 | 10/1998 | Hase et al. .............................. 29/705 |
| 5,819,126 | * 10/1998 | Kitagawa et al. .................... 396/319 |
| 5,896,293 | * 4/1999 | Teramoto et al. ............... 364/468.18 |
| 5,992,743 | * 11/1999 | Suemoto et al. ................. 235/462.05 |
| 5,995,768 | * 11/1999 | Kitagawa et al. .................... 396/208 |

FOREIGN PATENT DOCUMENTS

| 57-28131 | 6/1982 | (JP) | G06K/5/00 |
| 4-59627 | 9/1992 | (JP) | G03C/1/00 |
| 5-93950 | 4/1993 | (JP) | G03B/17/04 |
| 6-160048 | 6/1994 | (JP) | G01B/11/24 |
| 6-161042 | 6/1994 | (JP) | G03C/3/00 |
| 7-120889 | 5/1995 | (JP) | G03C/3/00 |
| 8-220701 | 8/1996 | (JP) | G03C/3/00 |
| 8-282837 | 10/1996 | (JP) | B65G/47/68 |

OTHER PUBLICATIONS

US Patent No. 5,427,224 corresponds to JPA No. 6–156688.
US Patent No. 5,647,113 and 5,815,911 corresponds to JPA No. 7–225149.
US Patent No. 5,714,028 corresponds to JPA NO. 8–262648.
US Patent No. 5,896,293 corresponds to JPA No. 9–258390.
US Patent No. 5,659,491 corresponds to JPA No. 7–225149.

* cited by examiner

*Primary Examiner*—David Nelms
*Assistant Examiner*—Thong Le
(74) *Attorney, Agent, or Firm*—Sughrue, Mion, Zinn, Macpeak & Seas, PLLC

(57) ABSTRACT

In a production process of a photo film cartridge, data relating to respective components and data obtained during the production process is written in an IC memory that is mounted to a cartridge shell of the photo film cartridge. The data written in the IC memory is read out at later stages of the production process for use in controlling production of the photo film cartridge. The data is at least partly maintained stored in the IC memory after the shipment, for use in tracing production history of the photo film cartridge. When a photo film cartridge having an IC memory is for use in a lens-fitted photo film unit, unit type data indicating the type of the film unit are written in the IC memory before loading the photo film cartridge in the film unit. The unit type data is read out from the IC memory to choose a proper type of packaging materials for the film unit before a unit body of the film unit is wrapped and packed in the packaging materials.

24 Claims, 14 Drawing Sheets

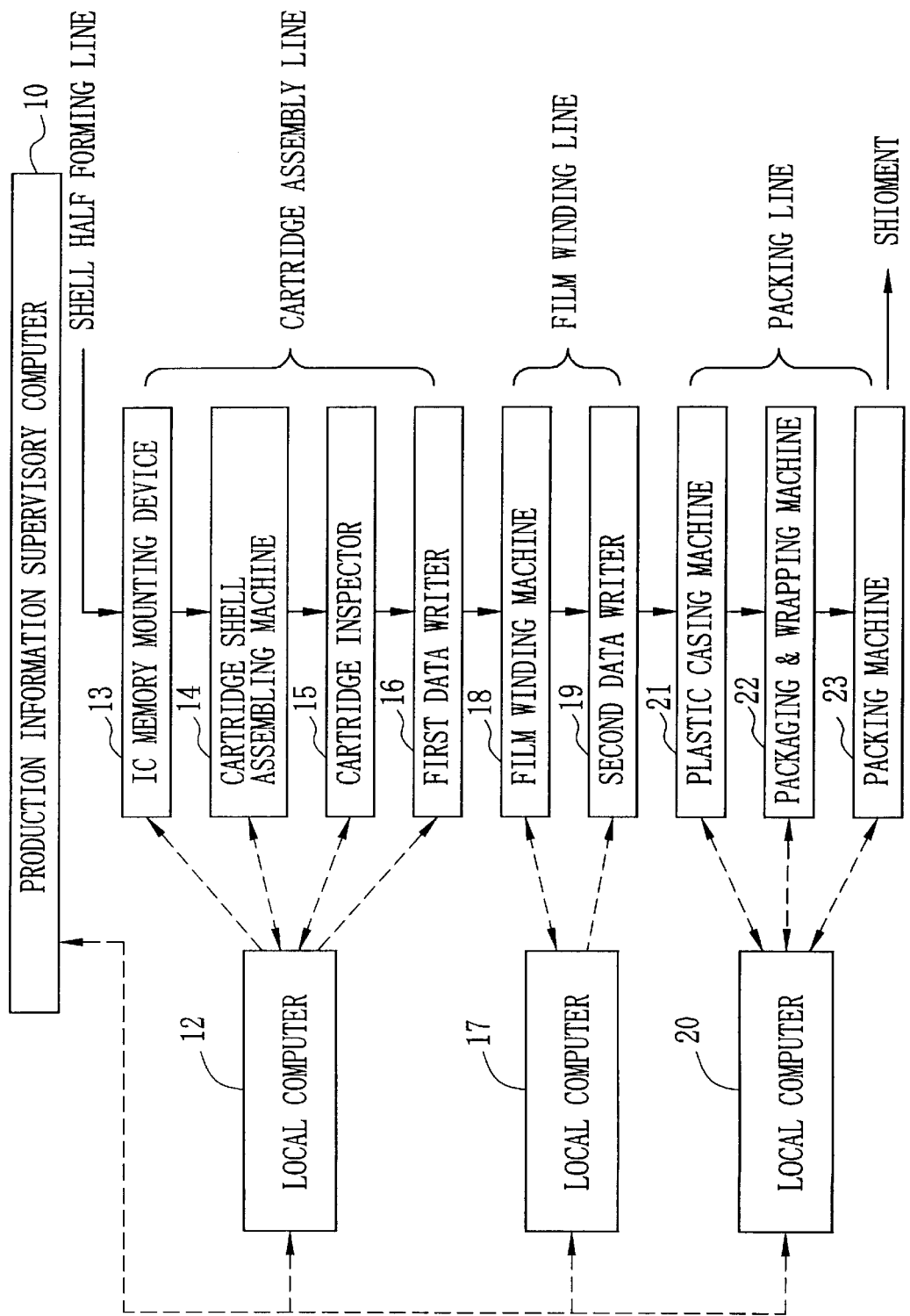
F I G. 4

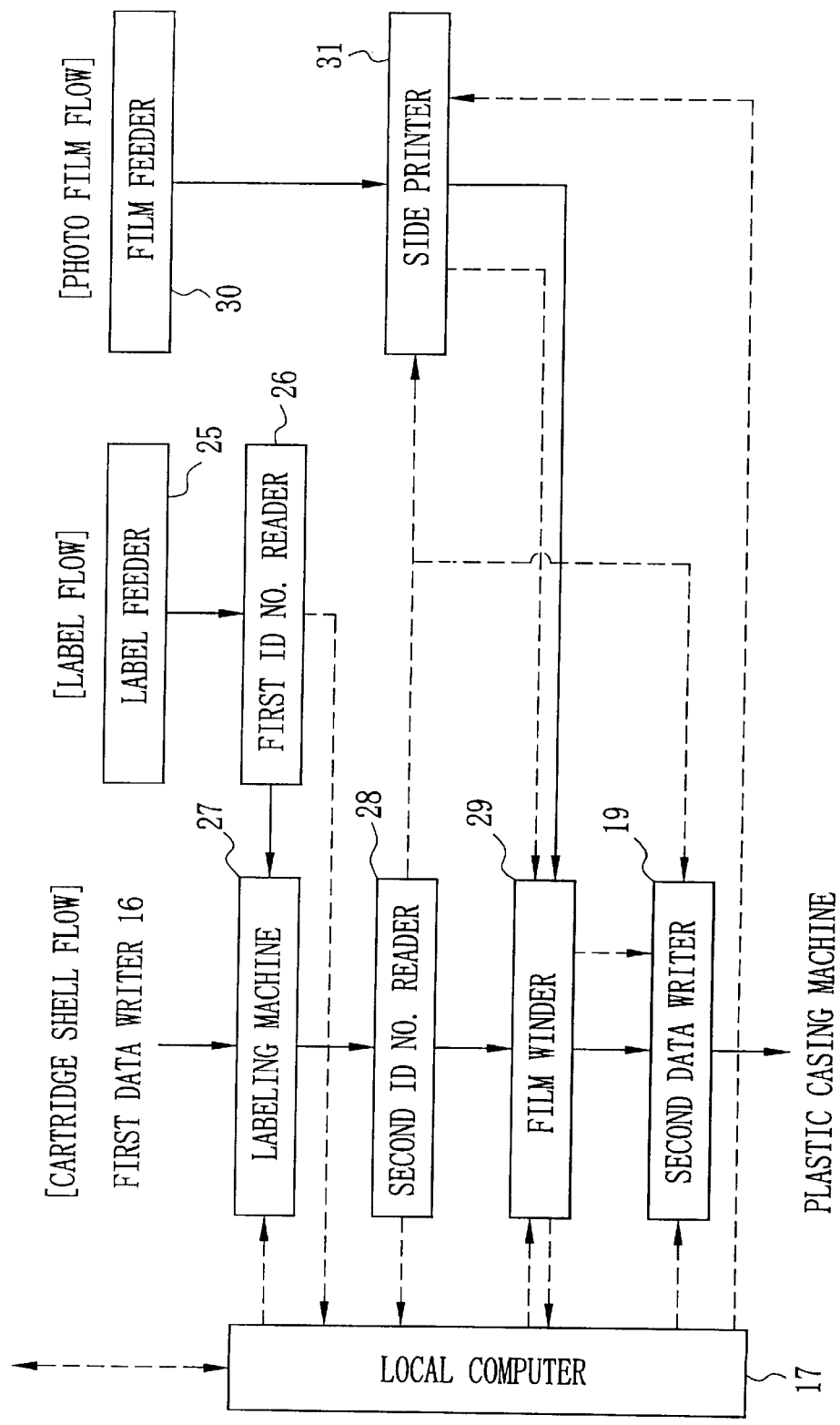
F I G. 5

METHOD OF CONTROLLING A PRODUCTION PROCESS AND RECYCLE OF PHOTO FILM CARTRIDGE OR LENS-FITTED PHOTO FILM UNIT

BACKGROUND OF THE INVENTION

1. Field of the Invention

The present invention relates to a method of controlling production or the recycle of photo film cartridges or lens-fitted photo film units, and more particularly to a method of managing information by use of IC memories mounted to the photo film cartridge or the film unit, for use in controlling the production process, the recycling process and quality of the photo film cartridges or the lens-fitted photo film units.

2. Background of the Invention

JPB No. 4-59627 discloses a production control method for controlling the manufacture and packing of photo film cartridges, wherein semi-products or products or components are each individually provided with an optically readable identification mark like a bar code, which is read by an optical sensor for collation at appropriate stages of the production. A general production control method using bar codes as identification marks is disclosed in JPB No. 57-28131, wherein the bar codes are used for collation between components, semi-products, products and packaging materials in order to prevent confusion between different types of components and regulate the flow of packaged products.

These production control systems using identification marks or bar codes cannot handle a sufficient amount of data necessary for tracing the production history of products. Since a new type photo film cartridge, called IX 240 type, is constituted of many components or parts compared to a conventional photo film cartridge like 135-type photo film cartridge, it is desirable to store data of each component not only for preventing confusion between different types of parts, but also for improving traceability of production history of the photo film cartridge.

U.S. Pat. No. 5,896,293 discloses a method of managing information for production of photo film cartridges, wherein the production processes of the photo film cartridges are supervised by computers. Data obtained from the respective processes, including feeding processes of raw materials, is collected by local computers in a real time fashion, and is transferred to a host computer, called a production information supervisory computer, to sum up as a database, so that the database may be used for many purposes such as production control, process control and quality control.

On manufacturing and packing lines of the IX 240 type photo film cartridge, all or sampled ones of semi-products or products or packaging materials are subjected to inspections. To make the most of data obtained during the inspections, it is necessary to correlate the inspection data to individual semi-products or products, or to manufacture lots. However, it takes a huge memory capacity to transfer all the data relating to the production, including the inspection data, to the production information supervisory computer, to make the database. Thus, the cost of information management inevitably increases.

A lens-fitted photo film unit, simply a film unit, is known as a product containing a photo film cartridge and having simple photographic mechanisms. After taking all available frames of photographs, the entire film unit is forwarded to a photo finisher. The photo finisher removes the photo film cartridge containing a strip of exposed filmstrip from a unit body for developing and printing. The developed filmstrip and the printed photographs are returned to the photographer.

Since the conventional film unit just has a lot number, it is only possible to know the date of manufacture, the line number and other limited production data from the lot number. Therefore, if trouble occurs in the film unit after the shipment, it is hard to trace the cause of the trouble and thus take a preventative measure against that trouble.

It is known in the art to previously record a service picture or pictures, such as illustration or title, on the filmstrip of a limited number of the film units. The design of the service picture varies depending upon where the film unit is expected to be sold or delivered. Usually, the design of the outer cover attached to the body of the film unit and that of a packaging material or gazette of the film unit are changed in accordance with the service picture. Even among those film units having no service print, the design of the outer cover and that of the packaging material tend to have many variations. To produce such specific film units, specific outer covers and specific packaging materials are set in place of standard outer covers and standard packaging materials in the conventional production control system, after a number of standard film units are produced to use up standard outer covers and standard packaging materials which are previously set in the production line.

Since it is necessary to wait till the production line completes production of standard or another kind of film units of a predetermined number, and replace the outer covers and packaging materials with another kind, producing a large variety of film units lowers the production efficiency. In addition, it is necessary to check if the combination between the outer cover, the packaging material, the unit body and the film cartridge is proper. It results in raising the total production cost.

To reduce industrial waste and prevent environmental pollution, used-up industrial products are required to be recovered for recycling. Recycling a product can be reusing the components as they are or reusing materials of the components for forming the same or other components. Hereinafter, reusing the material will be referred to as material recycling, whereas reusing the component will be referred to just as reuse. JPA No. 5-93950 discloses a method of indicating and detecting how many times and when the film unit has been recycled.

Also, JPA No. 6-161042 discloses an automatic disassembling line for the used film unit, wherein snap-in engagements between components of the film unit are disengaged to separate reusable components and those for recycling from the used film unit. Since the engaging portions are located differently according to the film unit type, it is necessary to sort the used film units according to the types before feeding them into the automatic disassembling line. For sorting, a type discrimination system of the film unit is disclosed in JPA No. 6-160048, wherein the film unit is positioned in a predetermined posture, and is photographed by a CCD camera. By comparing image data from the CCD camera with previously stored image data, the type of the film unit is determined.

The reusable components need to be examined as to whether they are practically reusable or not. U.S. Pat. No. 5,659,491 discloses an inspection apparatus for a flash unit used in the film unit, and a system for discriminating between reusable flash units, repairable flash units and others. The inspection apparatus performs an appearance test, inspections on mechanical and electrical functions.

Each flash unit is placed on a pallet and conveyed sequentially to respective inspection stages. The pallet is provided with an ID unit for storing data obtained from the respective inspections. The ID unit consists of an infrared sending-receiving section, a communication interface, a CPU and a memory. At the conclusion of all inspections, data stored in the ID unit of each pallet is read out for judgement on respective inspection items as well as for total judgement.

Because the CCD camera and an image discrimination device for discriminating the type of film units based on image data are expensive, the type of discrimination system disclosed in the above prior art is expensive. Beside that, the type of discrimination system cannot discriminate between those types having the same outer appearance. Also, the discrimination system of the above U.S. patent is expensive as using a lot of pallets with the ID units each containing the CPU. Moreover, the pallets need to be inspected, which increases the number of necessary processes for the discrimination.

SUMMARY OF THE INVENTION

In view of the foregoing, an object of the present invention is to provide a method of controlling production of photo film cartridges or film units, which manages a large amount of information necessary for the production at high efficiency, requires less memory capacity to the information supervisory computer, and cuts the cost of information management.

Another object of the present invention is to provide a method of controlling production of photo film cartridges or film units, which enables discriminating the type of each product or semi-product or component efficiently at a low cost during the manufacture.

Still another object of the present invention is to provide a method of managing information on photo film cartridges or film units, which improves traceability of the photo film cartridges or the film units during the manufacture and at the maintenance service.

A further object of the present invention is to provide a method of recycling film units which enables discriminating the type of each film unit and controlling the quality of the recycled film units effeciently at a low cost.

To achieve the above objects, the present invention provides a method of controlling production of a photo film cartridge having an IC memory mounted to a cartridge shell thereof, which comprises the steps of: writing data obtained in a production process of the photo film cartridge in the IC memory; and reading data from the IC memory at later stages of the production process for use in controlling production of the photo film cartridge.

A method of controlling production of a lens-fitted photo film unit comprises the steps of: mounting an IC memory to at least a portion of the lens-fitted photo film unit; writing data obtained in production process of the lens-fitted photo film unit in the IC memory through an access device provided in the unit body for allowing to access the IC memory from outside the unit body; and reading data from the IC memory at later stages of the production process of the lens-fitted photo film unit for use in controlling production of the lens-fitted photo film unit.

Since data necessary for the production of the photo film cartridge is stored in the IC memory of each product, it is possible to manage information at high efficiency without the need for a huge memory capacity to the information supervisory computer. By storing the data obtained during the production process in the IC memory of each product, it is possible to retrieve the data from the IC memory at any stage of the production process, and even after the shipment. Therefore, traceability of the photo film cartridges or the film units during the manufacture and at the maintenance service is remarkably improved.

According to the present invention, a method of recycling a lens-fitted photo film unit having a unit body containing a photo film cartridge therein and consisting of a plurality of components, comprises the steps of: providing at least one of the components with an IC memory; providing the unit body with an access device for allowing to access the IC memory from outside the unit body; writing at least unit type data representative of a type of the lens-fitted photo film unit during a production process of the lens-fitted photo film unit; reading the unit type data from the IC memory after the lens-fitted photo film unit is used and collected for recycling; sorting the lens-fitted photo film unit according to the type shown by the unit type data; and feeding the lens-fitted photo film unit to a disassembling line provided for the type of the lens-fitted photo film unit.

Accordingly, it is not necessary to use an expensive CCD camera and image discrimination device for discriminating the type of the lens-fitted photo film unit.

A method of recycling a lens-fitted photo film unit having a unit body containing a photo film cartridge therein and consisting of a plurality of components, the method comprising the steps of: mounting an IC memory to each of those components which are expected to be reused during a production process; inspecting each of the components to determine whether it is reusable or not after the lens-fitted photo film unit is used and collected for recycling; and writing use data in the IC memory of one component as a record of reuse of the one component before reusing the one component to manufacture a second lens-fitted photo film unit, if the one component is qualified for reuse, wherein the use data is read out from the IC memory for judging whether the one component is reusable again or not when the second lens-fitted photo film unit is collected for recycling.

This method improves efficiency of sorting out reusable components. The use data may be utilized for quality control of the recycled products.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting of the present invention, wherein like reference numerals designate like or corresponding parts throughout the several views, and wherein:

FIG. 4 is a functional block diagram illustrating a cartridge assembly line, a film winding line, and a packing line;

FIG. 5 is a functional block diagram illustrating the work flow and the data flow in the film winding line;

DETAILED DESCRIPTION OF THE PREFERRED EMBODIMENT

Figure 1:
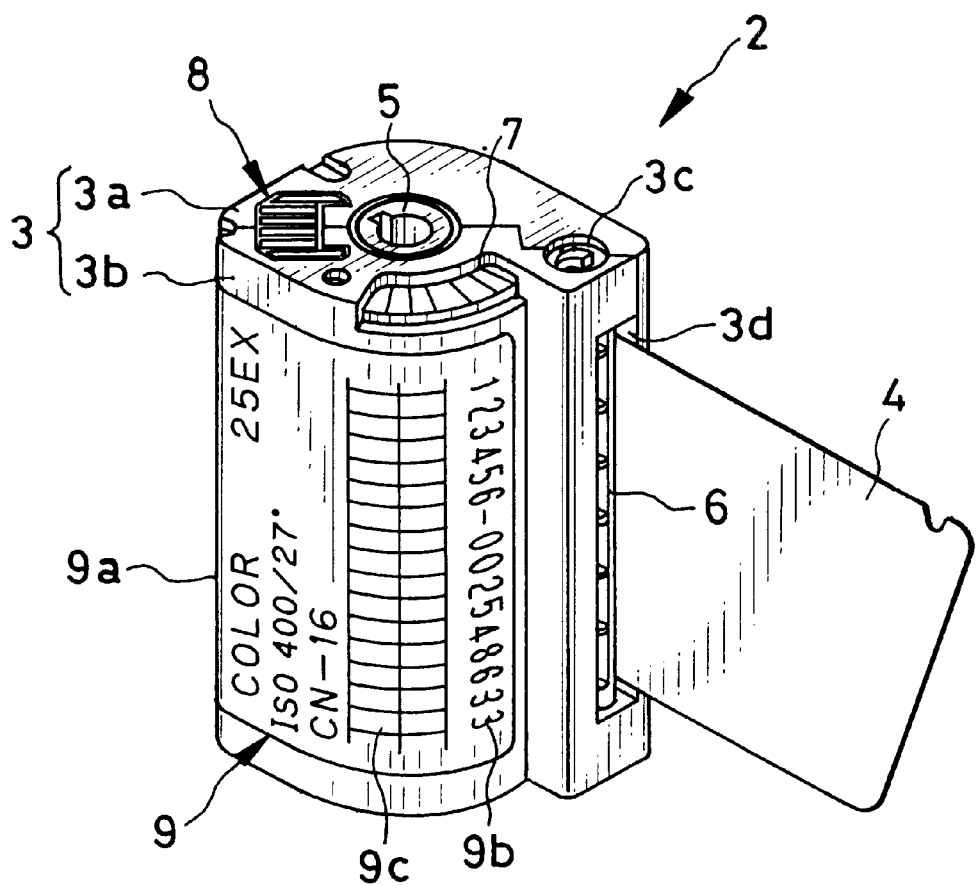
FIG. 1 is a perspective view of a photo film cartridge produced according a production control method of the present invention.

FIG. 1 shows a photo film cartridge produced according to a production control method of the invention. The photo film cartridge 2 consists of a cartridge shell 3 and a roll of photo filmstrip 4 contained therein. The photo film cartridge 2 substantially has the same construction as those called IX 240 type, except that the photo film cartridge 2 is provided with an IC memory 8. The cartridge shell 3 consists of a pair of shell halves 3a and 3b formed from a plastic material, and a spool 5 is rotatably mounted in between the shell halves 3a and 3b. A light-shielding door member 6 is mounted in a film port 3d of the cartridge shell 3. The door member 6 is rotated to open and close the film port 3d by a door operating member that is coupled to the door member 6 through a hole 3c of the cartridge shell 3.

The entire length of the filmstrip 4 is located inside the cartridge shell 3 and the door member 6 is closed hen the photo film cartridge 2 is not used. To use the photo film cartridge 2, the door member 6 is opened, and then the spool 5 is rotated in an unwinding direction to advance a leader of the filmstrip 4 out through the film port 3d. To stop the spool 5 from rotating while the door member 6 is closed, a not-shown spool lock mechanism is interconnected between the spool 5 and the door member 6.

A data disc 7 is securely mounted on the spool 5, and is partly exposed through a cutout of the cartridge shell 3. The data disc 7 has a bar code thereon that represents the type of the filmstrip 4, such as color or white-and-black, negative or positive, the size of the filmstrip 4, i.e. the number of available exposure, the film speed, and other film data.

The IC memory 8 consists of memory chips and a substrate on which a plurality of contacts and a control circuit for controlling input and output are formed. The memory chips are a non-volatile memory that is capable of writing, deleting and revising data, e.g., EEPROM. The six contacts in this embodiment are exposed to the outside of the cartridge shell 3, and are used as a power source terminal, a ground terminal, a serial data input terminal, a serial data output terminal, a clock terminal, and a chip select terminal respectively.

A label 9 is put around the cartridge shell 3 across the shell halves 3a and 3b. The label 9 has literal information 9a on the type, the size and the speed of the filmstrip 4, an ID number 9b of the cartridge shell 3 and a bar code 9c printed thereon. The bar code 9c is representative of the ID number 9b, the film type, the film size and the film speed.

The filmstrip 4 has a transparent magnetic recording layer on its base surface. Also, frame numbers and information on the filmstrip 4, including the type, the size, the speed, the name of manufacturer, and an ID number of the filmstrip 4, are recorded on side portions of the filmstrip in form of latent images.

Since the IX 240 type photo film cartridge consists of more parts than a conventional 135-type photo film cartridge, data necessary for and obtained during the production of the IX 240 type photo film cartridge is supervised by a production information supervisory computer for the purpose of preventing confusion between different parts, and uniting the ID number of the cartridge shell 3 with that of the filmstrip 4.

Figure 2:
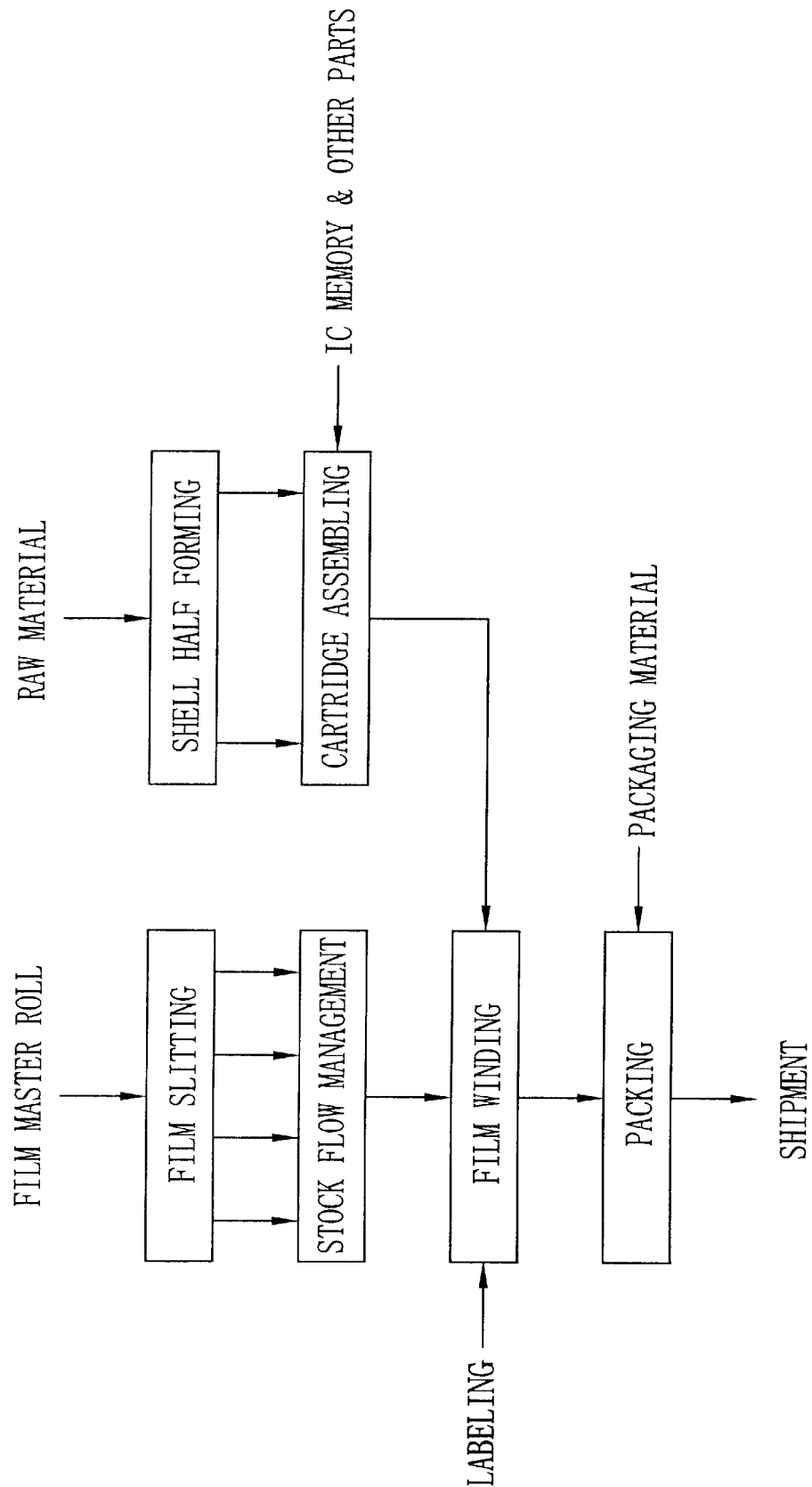
FIG. 2 is a functional block diagram illustrating the overall production process of the photo film cartridge.

FIG. 2 shows an abstract of the production process of the photo film cartridge 2. A master roll is made by forming an emulsion layer on one surface of a wide web of film base material and coating an opposite surface to the emulsion layer with the transparent magnetic layer. A production lot number and the number of the emulsion are provided on a reel of the master roll or on the outer end of the master roll in the form of a bar code or magnetic data. The master roll is slit into continuous strips of the same width as the filmstrip 4. The continuous strips are respectively wound on reels into rolls, hereinafter called slit rolls.

A label, having a slit number indicating the original location of the slit roll in the crosswise direction of the master roll as well as the production lot number and the emulsion number of the master roll recorded thereon, is attached to the reel and/or the outer end of each roll of the continuous strip. The slit rolls produced from the same master roll are loaded in an automatic vehicle in a light-tight fashion, and these vehicles are stored in a storage room. The data of the master rolls and the slit rolls as well as the number of the slit rolls in stock are monitored by the production information supervisory computer on the basis of the labels, so that it is possible to pick up an appropriate number of designated slit rolls from the storage room for the cartridge manufacture.

To form shell halves 3a and 3b, resin pellets of raw material are supplied to injection molding machines. The formed shell halves 3a and 3b, and other parts, including the spool 5, the door member 6, the data disc 7 and the IC memory 8, are sequentially supplied to a cartridge assembly line. These parts are loaded on parts-trays in the production lots, and the trays are sequentially supplied to the cartridge assembly line. Each individual tray has a tray ID number, so the production lots of the respective parts are identified on the basis of the tray ID numbers in the same way as disclosed in U.S. Pat. No. 5,896,293.

That is, the tray ID number is correlated to the production lot number of the parts on the tray, and data correlating the tray ID numbers to the production lot numbers of the respective parts is stored as a database in a memory under the control of the production information supervisory computers. Therefore, by transferring the tray ID number of the tray to the memory each time the tray is fed to the cartridge assembly line, it is possible to trace the production history data of the cartridge shells 3, i.e. the production lot numbers of the respective parts of each cartridge shell 3, on the basis of the tray ID numbers. As set forth in detail later, a process for writing data in the IC memory is included in the cartridge assembly line. After the IC memory 8 is incorporated into the cartridge shell 3, it is possible to manage some of the production information by each individual cartridge shell 3.

The slit rolls, the cartridge shells 3 and the labels 9 are supplied to a film winding line. In the film winding line, first the label 9 is put on the cartridge shell 3. Prior to putting on the label 9, the bar code 9c on the label 9 is read out to confirm whether the film type, the film size represented by the bar code 9c coincide with those of the photo film cartridges 2 as being manufactured. If not, a warning is given to the operator. In the film winding line, perforations are formed through the continuous strip, data is recorded as a latent image on the side portions of the continuous strip, and then the continuous strip is cut into a designated length to provide the filmstrip 4. Then, the filmstrip 4 is headed toward the cartridge shell 3 which is placed in a predetermined position, and a trailing end of the filmstrip 4 is inserted into the cartridge shell 3 through the film port 3d by use of a film inserter, to fasten the trailing end to the spool 5. Thereafter, the spool 5 is driven to rotate in a winding direction to wind up the entire length of the filmstrip 4 into the cartridge shell 3. Then, the door member 6 is closed. The detail of the film winding process is disclosed in JPA 7-120889 and JPA 7-325366. The complete photo film cartridges 2 are sent to a packing line, wherein the photo film cartridge 2 is packed into a plastic case and a cardboard casket, and is wrapped up in cellophane sheet and packed in a corrugated cardboard box for shipment. The corrugated cardboard box is provided with a package ID number, which is read and transferred to the production information supervisory computer. The package ID numbers are stored as a database for use in stock flow management.

Figure 3:
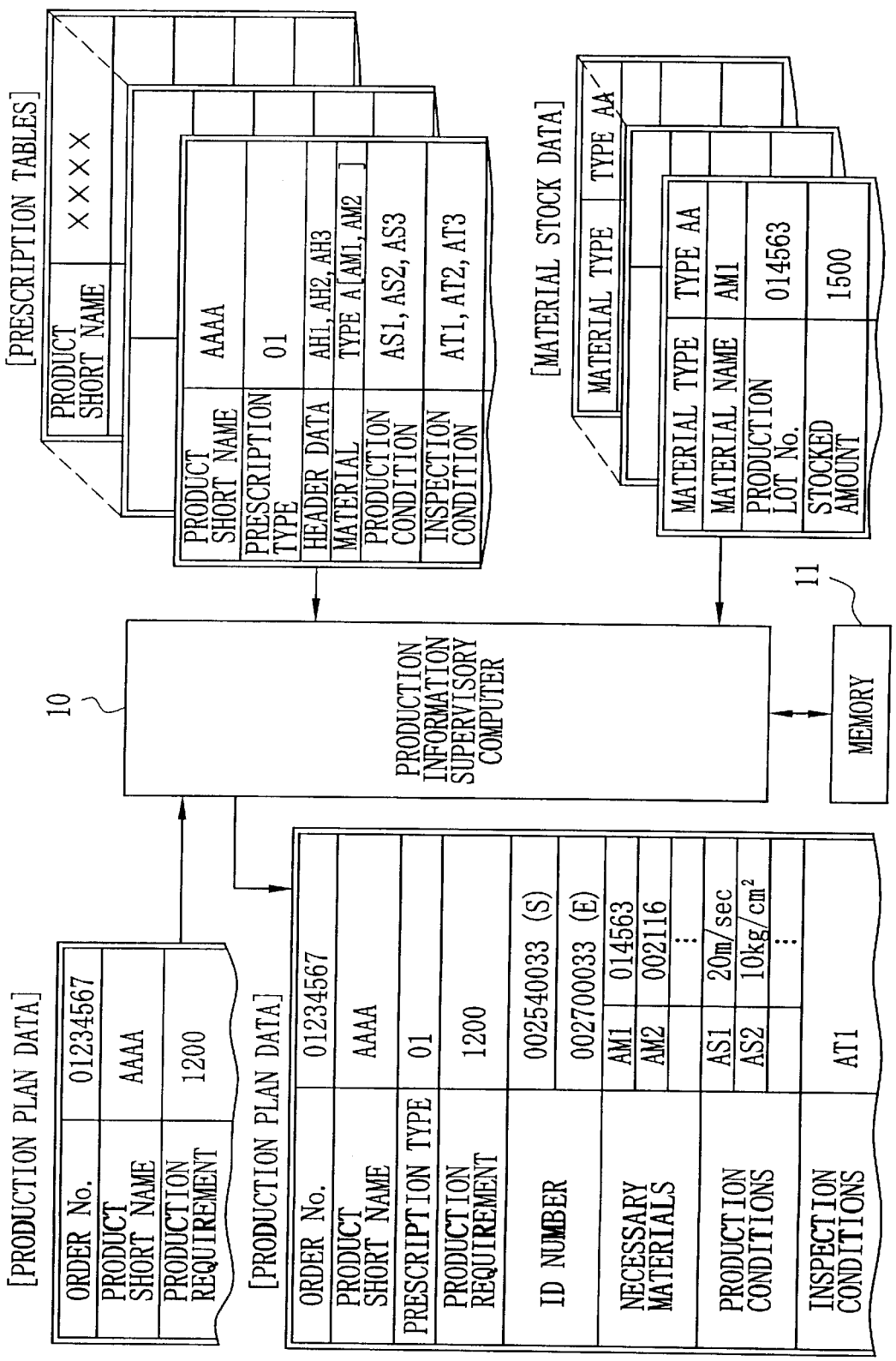
FIG. 3 is an explanatory view illustrating data formats of data fed in and fed out of a production information supervisory computer.

Production facilities used in the above lines are controlled by local computers which are installed in the respective lines, and the local computers are supervised by the production information supervisory computer. As shown in FIG. 3, the production information supervisory computer 10 produces a common production order table upon receipt of production plan data. The production plan data includes an order number, a product short name of the film cartridge type to produce, the requisite number of cartridges to produce, and the like. The production information supervisory computer 10 retrieves prescription data from the prescription table based on the product short name, e.g. "AAAA", that is included in the production plan data. Thus, the prescription type or number, the types and names of the materials and parts, production conditions and inspection conditions necessary for producing the photo film cartridge type "AAAA" are determined.

After the types and names of the necessary materials and parts are determined, the production information supervisory computer 10 accesses to the material stock data to display stock data on a monitor screen, to permit checking if there are enough materials in stock to produce the designated type photo film cartridges up to the requisite production number designated by the production plan. IF any of the necessary materials is short in stock, the monitor screen displays along with the production plan data the name of the materials in short and the shortage compared with the production plan, and the maximum number of the photo film cartridges that can be produced at present. The prescription table also stores header data as supplementary data, e.g. the necessary mark-up of the actual production number on the requisite production number, which is to take the risk or estimated rejection rate and operating factor into account.

When it is confirmed that the stock of all necessary materials is sufficient, the production information supervisory computer 10 produces the common production order table. In the common production order table, the prescription type, the production number, the names of the materials to use, the production conditions and the inspection conditions are assigned to an order number and the product short name of the film cartridge type. Some items are fixedly determined according to the film cartridge type, and other items are variable. For example, the name and the requisite number of each material are automatically determined by the film cartridge type. The production lot numbers of the respective materials and some of the production and inspection conditions may be set up optionally.

Also the ID numbers are included in the fixed items. Accordingly, the production information supervisory computer 10 refers to the range of ID numbers serially recorded on the labels 9 that are already prepared, and compares it with the number of the photo film cartridges 2 that are planning to produce, to determine the range of usable ID numbers. The range of the usable ID numbers is indicated in the production order table.

Thus, it is possible to choose those materials which are determined to be optimum in view of their production histories by designating their production lot numbers, so that a flexible measure can be taken for quality stabilizing. These optionally variable items can be set up not only through the production information supervisory computer 10, but also through the local computers. When the optional items are set up through the local computers, the setup data is fed back to the production information supervisory computer 10.

All the common production order tables are stored in a memory 11 of the production information supervisory computer 10. The production information supervisory computer 10 sorts out various kinds of data pieces in the common production order table, such as the names of the materials selected and their production lot numbers, the production conditions and the inspection conditions, for the respective manufacturing lines, and sends them along with the order number, the product short name, the prescription type and the production number to the local computers for the respective manufacturing lines. For example, the local computer for controlling the cartridge assembly line receives the names of the materials or parts to assemble the cartridge shell 3 and their production lot numbers, and the production conditions and the inspection conditions for the cartridge assembly line in the form of an individual production order table. Then, the local computer displays the individual production order table on its monitor screen, and sends commands to the respective sections of the cartridge assembly line to adapt to the determined production and inspection conditions.

As described above, the production information supervisory computer 10 controls the respective local computers through the inter-factory network, produces and stores common production order tables in accordance with production plan data, produces individual production order tables for the respective manufacture lines and sends them to the corresponding local computers. After the manufacturing lines start operations, performance data is fed from the manufacturing lines back to the production information supervisory computer 10, which then stores the performance data along with the common production order table.

FIG. 4 shows the production facilities of the cartridge assembly line, the film winding line and the packing line, wherein arrows shown by solid lines indicate the flow of works, or parts of the photo film cartridge 2, whereas arrows shown by dashed lines indicate the flow of data exchanged as electric signals between the facilities. In the cartridge assembly line, an IC memory mounting device 13 mounts the IC memory 8 to the shell half 3a. The IC memory mounting device 13 receives the production order table from the production information supervisory computer 10 through a local computer 12, so the IC memory mounting device 13 chooses those IC memories of a production lot assigned by the production order table. Thereafter, the shell half 3a is sent to a cartridge shell assembling machine 14 along with the other shell half 3b and other parts, which automatically assembles them into the cartridge shell 3.

The cartridge shell assembling machine 14 also receives the production order table from the production information supervisory computer 10, and refers to the table to check if the parts fed to the cartridge shell assembling machine 14 accord to the production plan. The cartridge shell assembling machine 14 has a photo sensor to read the bar code on the data disc 7 before being mounted in the cartridge shell 3, to check if the cartridge type represented by the bar code coincides with that assigned in the production order table.

The cartridge shells 3 thus assembled are sent one by one to a cartridge inspector 15 to check the functions of every one of the cartridge shells 3. For example, the cartridge inspector 15 measures torques of the spool 5 and the door member 6 in either rotational direction in the same way as disclosed in JPA 8-220701. It is preferable to measure the locking force of the spool lock mechanism interconnected between the spool 5 and the door member 6.

Data of the torques measured by the cartridge inspector 15 is fed back to the local computer 12, and is compared to normal values indicated in the production order table. If the results of comparison show that the measured torques are within a predetermined qualification range, the cartridge shell 3 is determined to be good and is sent to the next process. If not, the cartridge shell 3 is discharged from the line. The torque data from the cartridge inspector 15 is stored in the local computer 12 for a limited time. It is possible to provide an imaging inspector having a CCD camera besides the cartridge inspector 17, to pick up image data from the cartridge shell 3. Based on the image data, dimensions of appropriate portions of the cartridge shell 3 are detected and compared to normal values. In that case, the detected dimensional data and the comparison results may be written in the IC memory 8.

The cartridge shell 3 that passed the inspection is sent to a first data writer 16. The first data writer 18 consists of a positioning device for positioning the cartridge shell 3 and six contact terminals for writing data in the IC memory 8. The first data writer 16 is under the control of the local computer 12. The six contact terminals are brought into tight contact with the six contacts of the IC memory 8 of the cartridge shell 3 positioned in a posture by the positioning device, and the torques measured and stored in the local computer 12 is transferred to the first data writer 16 to write it in the IC memory 8.

The first data writer 16 also writes fundamental film data, such as the film type, the film size, the film speed of the photo film cartridge 2 to produce, in the IC memory 8, data besides the data obtained during the production process. The local computer 12 reads out the fundamental film data from the production order table sent from the production information supervisory computer 10, and sends it to the first data writer 16.

It is possible to feed the disqualified cartridge shells 3 to the first data writer 16 and write their measured torques in their IC memories 8 before discharging the disqualified cartridge shells 3 from the manufacturing lines. The data written in the IC memories 8 of the disqualified cartridge shells 3 may be used for analyzing the causes of their defects.

The cartridge shell 3 is fed from the first data writer 16 to a film winding machine 18 of the film winding line, wherein the filmstrip 4 is wound into the cartridge shell 3, completing the photo film cartridge 2. From the film winding line, the photo film cartridge 2 is fed to the packing line, after a second data writer 19 writes data in the IC memory 8. In the packing line, a plastic casing machine 21 packs the photo film cartridge 2 into a plastic case, and a packaging and wrapping machine 22 inserts the photo film cartridge 2 contained in the plastic case in a casket and wraps the casket with cellophane sheet, and then a packing machine 23 packs the caskets in a corrugated cardboard box. The film winding line is controlled by a local computer 17, whereas the packing line is controlled by a local computer 20.

FIG. 5 shows the film winding line in detail, wherein arrows shown by solid lines indicate the flow of the works or parts, whereas arrows shown by dashed lines indicate the data flow. A label feeder 25 feeds the label 9 as shown in FIG. 1 to a labeling machine 27 one after another out of a label tape that has a series of adhesive labels 9 along a long strip of release paper. A first ID number reader 26 is located in a course of the label tape from the label feeder 25 to the labeling machine 27, to read the bar code 9c on the label 9 and feed the read bar code data in the local computer 17. The bar code data consists of fundamental film data, including a film type, a film size, a film speed of the filmstrip 4 to combine with the cartridge shell 3, and an ID number.

The local computer 17 checks if the film data read by the first ID number reader 26 coincides with data of a film indicated by the product short name on the production order table, and if the ID number read by the first ID number reader 26 is within the range of usable ID numbers designated by the production order table. If there is any difference in the fundamental film data or the ID number, the local computer 17 interrupts the labeling machine 27 and gives an alarm to the operator.

If there is not any difference in the fundamental film data and the ID number, the labeling machine 27 puts the label 9 on the cartridge shell 3. The label feeder 25 and the labeling machine 26 may be those disclosed in U.S. Pat. No. 5,714,028.

The cartridge shell 3 having the label 9 thereon is placed in a film winder 29 after passing through a second ID number reader 28. The film winder 29 may have the same configuration as disclosed in U.S. Pat. No. 5,647,113. That is, the film winder 29 has a rotary barrel at an end of a feeding path of the filmstrip 4 from a film feeder 30 to the film winder 29, and the rotary barrel has two holders for holding the cartridge shell 3 each. The rotary barrel is rotated stepwise by 180 degrees, so that one of the two holders is placed in a chucking position, while the other is placed in a film winding position.

At the chucking position, one empty cartridge shell 3 is chucked by the holder after another cartridge shell 3 containing the filmstrip 4 therein is removed from that holder. At the film winding position, the door member 6 of the empty cartridge shell 3 is opened, and the trailing end of the filmstrip 4 that is fed to the chucking position is inserted through the film port 3d and is engaged with the spool 5. Then, the spool 5 is rotated in the winding direction to wind up the entire length of the filmstrip 4 into the cartridge shell 3. Thereafter, the door member 6 is closed, and the rotary barrel is rotated by 180 degrees.

While the filmstrip 4 is fed to the film winder 29, a side printer 31 makes side-printing, that is, photographically records the film type, the film size, the film speed, the frame numbers, the name of manufacturer, the ID number, and a bar code corresponding to these film data on the side portions of the filmstrip 4. Prior to starting the side printing, the second ID number reader 28 reads out the bar code 9c on the label 9 of the empty cartridge shell 3 at the chucking position, and sends the ID number included in the bar code to the side printer 31. Therefore, the side printer 31 prints the ID number in accordance with the ID number data from the second ID number reader 28, so the ID number printed on the filmstrip 4 coincides with the ID number 9b and the bar code 9c on the label 9 of the cartridge shell 3 to contain the filmstrip 4 therein.

Besides the ID number, it is possible to send other film data from the second ID number reader 28 to the side printer to record the film data as well as the ID number on the filmstrip 4 in accordance with the bar code 9c on the label 9, although the film data is sent to the side printer 31 from the production information supervisory computer 10 through the local computer 17. It is also possible to write the data recorded on the filmstrip 4 in the IC memory 8.

While the filmstrip 4 is wound into the cartridge shell 3, the torque of the spool 5 is measured at the film winding position, and the measured values are sent to the local computer 17. Also the torque of the door member 6 is measured while the door member 6 is opened and then closed before and after the film winding. The torque data of the door member 6 is also sent the local computer 17, and is temporarily stored along with the torque data of the spool 5 in the local computer 17. Torque measuring devices for the spool 5 and the door member 6, those disclosed in JPA 8-220701 are usable. It is possible to detect and store data of the locking force of the spool lock mechanism in the condition where the filmstrip 4 is wound into the cartridge shell 3.

The local computer 17 compares the torque data to normal values. If the torque data is within a standard range, the photo film cartridge 2 is transferred from the chucking position to a conveyer system for good products. If not, the photo film cartridge 2 is eliminated from the production line. Before the photo film cartridge 2 is removed from the holder of the rotary barrel at the chucking position, the second ID number reader 28 reads the bar code 9c again to correlate the ID number to discrimination data between the good products and the defective products. The correlation data is sent as performance data to the production information supervisory computer 10 through the local computer 17.

The photo film cartridge 2 qualified as a good one is sent to the second data writer 19. The second data writer 19 has the same function as the first data writer 16, and writes the IC memory 8 with the torque data stored in the local computer 17, and the ID number read from the label 9 by the second ID number reader 28. Production control data, including machine type and machine number of the film winder 29 used in the film winding line, and date and time of winding, is sent from the production information supervisory computer to the second data writer 19, so the second data writer writes the production control data in the IC memory 8.

Then, the photo film cartridge 2 is transferred to the packing line, to be packed and shipped the way as described above. When packing in the corrugated cardboard box, a bar code provided on the box is read and sent to the production information supervisory computer, for use as shipment data.

As described so far, the IC memory 8 of the photo film cartridge 2 stores the film data of the filmstrip 4 contained therein, the torque data of the spool 5 and the door member 6 measured by the cartridge inspector 15 in the cartridge assembly line and also in the film winding line, the machine type and number of the film winder 29, and the date and time of film winding. It is possible to write the type and the machine number of the cartridge shell assembling machine 14 used for assembling the cartridge shell 3 in the IC memory 8.

Accordingly, it is possible to roughly trace the production history of the photo film cartridge 2 on the basis of the data stored in the IC memory 8 after the shipment of the photo film cartridge 2, e.g. when some trouble occurs during the use of the photo film cartridge 2. Therefore, it is not always necessary to retrieve data from the huge database stored in the production information supervisory computer, so it is possible to deal with the trouble quicker than conventionally.

Since it is enough to install a stand-alone type small scale microcomputer and a data reading device for reading data from the IC memory 8, branch offices of the manufacturer can investigate the photo film cartridge 2 by themselves. Although it is necessary to access the production information supervisory computer for retrieving more detailed manufacture data such as the emulsion number and the lot numbers of the used parts, retrieval of the detailed manufacture data becomes more quick and accurate by using the data read out from the IC memory 8 as key words.

By storing data that is specific to each individual photo film cartridge 2, like the torque data of the spool 5 and the door member 6 and other measurement data, in the IC memory 8, it becomes unnecessary to store the specific data in the database of the production information supervisory computer. This contributes to simplifying the hard construction of the production information supervisory computer, and cutting cost such as management cost and maintenance cost. The IC memory 8 may store more data than described above if the IC memory 8 has a memory capacity of ten to several tens Kbit. Then, more precise production control and quality control will be achieved.

The IC memory 8 is preferably written with names of the raw materials, manufacture lot numbers, date and time of manufacture, inspection results of the respective parts of the cartridge shell 3. As for those parts produced by other manufacturers, it is useful to write name of the manufacturer, date of shipment, and inspection results at the shipment in the IC memory 8. The data of the respective parts is convenient for tracing production history of each part of each photo film cartridge 2 after the shipment. The data of the respective parts may be written in the IC memory on appropriate production lines, or off the production lines by transferring the data from the production information supervisory computer.

It is possible to write the IC memory 8 with data of production history of the emulsion and the film base, machine type and machine number of an emulsion coating machine, those of a slitter used for slitting the master roll, the slit number, manufacture date and time of the filmstrip 4, inspection results of the filmstrip 4. Moreover, the IC memory 8 may store any of manufacture condition data, such as umidity and temperature of the production lines, operating conditions of the respective production facilities and name of the operator, as well as results of various inspections performed off the production lines, results of inspections at the shipment, name of inspector, type and manufacturer of the label 9.

It is also possible to write shipment data, such as address of recipient and due date of shipment, in the IC memory 8 on or off the production line, because the recipient is often designated when preparing the production plan data. If the photo film cartridge 2 is to be used in a lens-fitted photo film unit, type of the film unit and lens type of its taking lens that is determined by the film unit type may preferably be written in the IC memory 8.

Among the production control data written in the IC memory 8, those data pieces which become unnecessary after the shipment as well as for tracing production history may be deleted at the conclusion of the film winding process. It is preferable to cipher those data pieces which are useful for checking quality and tracing production history but are required to be confidential when writing them in the IC memory 8. Among known cryptographic methods, "RSA", a disclosed key encryption method that is recommended to be an encipherment algorithm compatible with the ISO Standard 9796, is useful for the IC memory 8.

In order to reduce the data writing process on the manufacturing lines, it is preferable to write the fundamental film data, in the IC memories 8 of a number corresponding to the requisite number of photo film cartridges 2 to produce that which is determined according to the production plan data, before the IC memories 8 are mounted in the cartridge shells 3. By reading data from the IC memory 8 at appropriate stages on the manufacturing lines, the data from the IC memory 8 may be used for controlling the production process. This contributes to preventing confusion of different types of parts reliably.

Although the IC memory 8 of the above embodiment has the contacts which are brought into contact with the contact terminals of the data writers, it is possible to incorporate an IC memory of non-contact type, e.g. an IC memory according to ISO 14443, into the photo film cartridge. In that case, data writing devices for the non-contact type IC memory should be installed in the manufacturing lines. According to this embodiment, it is not necessary to interrupt conveying the works for the data writing, so that the production efficiency is improved.

The production controlling method of the invention is applicable not only to the IX 240 type photo film cartridge but also to the 135 type photo film cartridge, and other magazines for any kinds of photographic materials such as instant film and color photographic paper. If the magazines or the cartridges are expected to be reused or recycled as materials, it is preferable to write data for reuse or recycle in the IC memory. The data for reuse or recycle may include information on how to recycle it or how many times the respective parts are reused. Thereby, the suitability for recycling is improved. If they are to be disposed of, it is preferable to write data of proper disposal in the IC memory, so as not to pollute the environment. Because the data for reuse or recycle or disposal may be written in the IC memory concurrently with the production control data and the fundamental film data, it does not affect the production efficiency.

Figure 6:
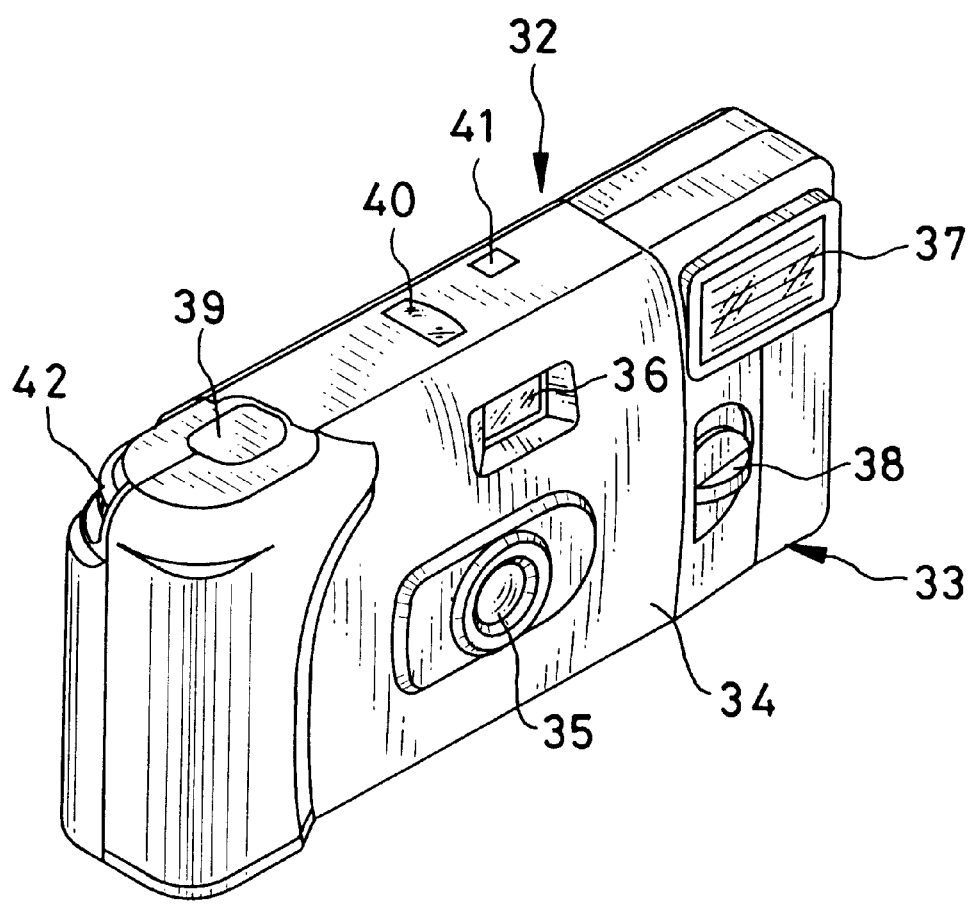
FIG. 6 is a perspective view of a lens-fitted photo film unit produced according to a production control method of the present invention.
Figure 7:
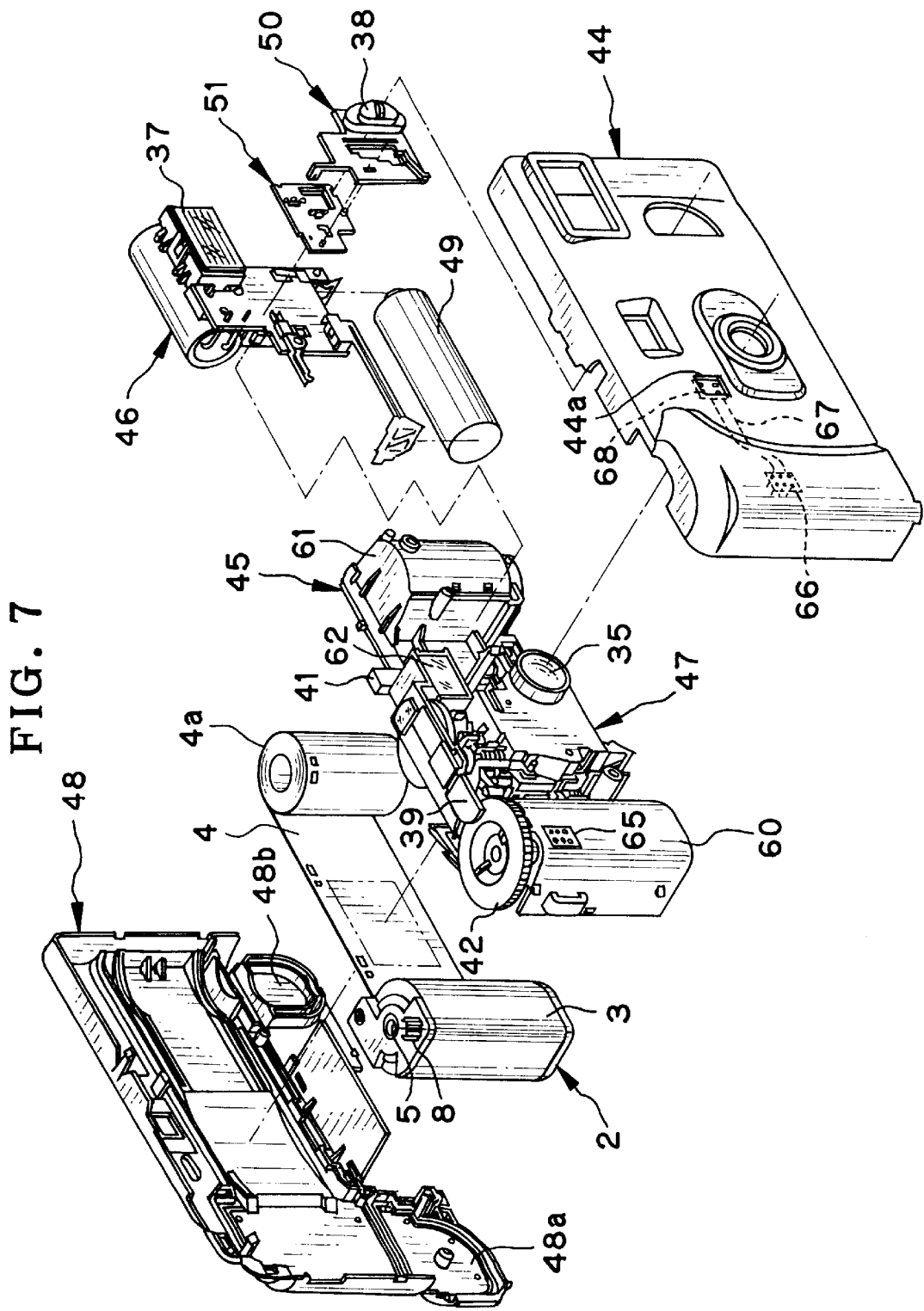
FIG. 7 is an exploded perspective view of a unit body of the film unit of FIG. 6.

FIG. 6 shows a lens-fitted photo film unit 32 produced according to a production control method of the present invention. The lens-fitted photo film unit 32, hereinafter referred to as the film unit, has a unit body 33 which is wrapped with an outer cover 34 made of cardboard paper or plastic sheet. A taking lens 35, a finder objective window 36, a flash projector 37 and a flash switch knob 38 are provided on a front side of the unit body 33, and a shutter button 39, a frame counter window 40 and a flash charge indicator 41 are provided on a top side of the unit body 33. A film winding wheel 42 is partly protruded out of a back side of the unit body 33. A photo film cartridge 2 having an IC memory 8 incorporated in its cartridge shell 3 is loaded in the unit body 33, as shown in FIG. 7.

The unit body 33 consists of a front housing 44, a basic portion 45, a flash unit 46, an exposure unit 47 and a rear housing 48. A battery 49 is attached to the flash unit 46. A switch plate 50 having the flash switch knob 38 formed thereon and a supporting plate 51 for the switch plate 51 are held between the flash unit 46 and the front housing 44. The front and rear housings 44 and 48 are each formed from a plastic resin material as an integral part.

The basic portion 45 is formed from a plastic resin material as an integral part having a cartridge chamber 60 and a film roll chamber 61. The photo film cartridge 2 has the same construction as shown in FIG. 1, but the IC memory 8 is a non-contact type IC memory in this embodiment. A filmstrip 4 drawn out of the cartridge shell 3 is wound into a roll 4a, and the empty cartridge shell 3 and the film roll 4a are put in a cartridge chamber 60 and a film roll chamber 61 of the basic portion 45 respectively. Thereafter, the rear housing 48 is attached to the rear side of the basic portion 45. These chambers 60 and 61 have open rear sides and open bottom sides, which are closed by the rear housing 48 and bottom lids 48a and 48b in a light-tight fashion.

The exposure unit 47 is attached to a front portion of the basic portion 45 between these chambers 60 and 61, and the taking lens 5 is mounted to a front portion of the exposure unit 47. The exposure unit 47 further has a shutter mechanism, a film counter mechanism, a film advancing mechanism, a finder optical system 62, and the flash charge indicator 41.

The flash unit 46 has the flash projector 37 and other flash circuit elements, such as a main capacitor and a triggering switch mounted to a printed circuit board. The flash unit 46 is turned on and off by operating the flash switch knob 38. A not-shown indicator lamp which indicates the completion of charging the main capacitor, e.g. a neon lamp or a light emission diode, is connected as a flash circuit element, and the light from the indicator lamp is projected to the outside through the flash charge indicator 41.

A connector 65 is provided on an outer wall of the cartridge chamber 60, and is electrically connected to not-shown terminals that are located inside the cartridge chamber 60. The terminals are opposed to the IC memory 8 of the photo film cartridge 2. In correspondence with the connector 65, a plug 66 is mounted to a rear portion of the front housing 44. The plug 66 is connected to a terminal chip 68 through a flexible substrate 67. The terminal chip 68 is exposed through an opening 44a that is formed through the front housing 44, so it is possible to write and read data in and out of the IC memory 8 through the terminal chip 68 after the photo film cartridge 2 is loaded in the unit body 33.

Figure 8:
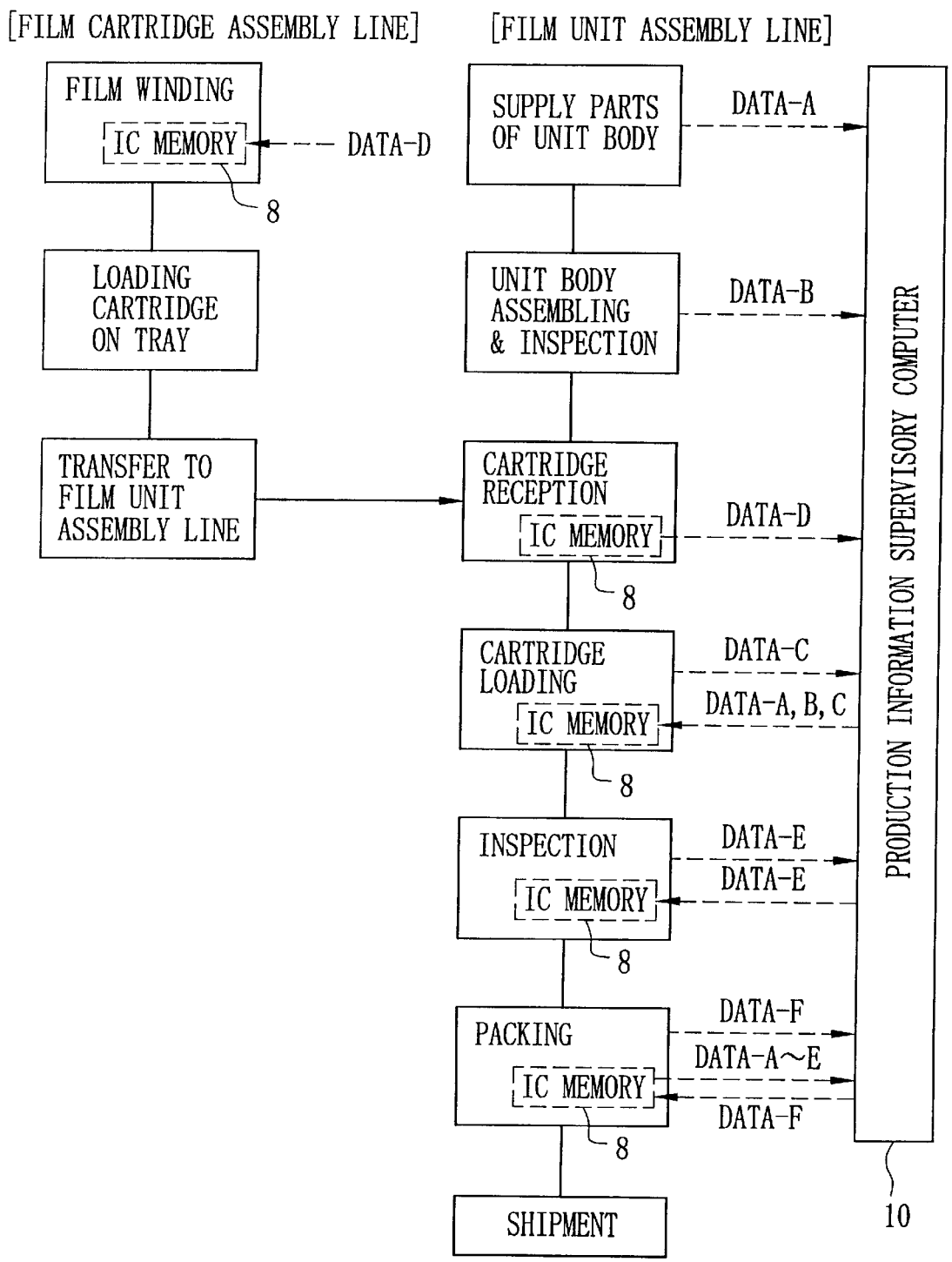
FIG. 8 is a functional block diagram illustrating the work flow and the data flow in film unit production lines.

FIG. 8 shows a film unit production process according to the present invention, wherein arrows shown by solid lines indicate the flow of works, whereas arrows shown by dashed lines indicate the data flow.

In a film cartridge assembly line, the filmstrip 4 is wound into the cartridge shell 3 after the IC memory 8 is mounted in the cartridge shell 3. Then, DATA-D is written in the IC memory 8. DATA-D includes the film speed, emulsion data, lot data, coating data, pre-exposure data and so forth. For example, the coating data indicates that there is a master roll that contains a defective portion thereon because of an uneven coating of the emulsion or a trouble occurred during its drying. The pre-exposure data relates to complimentary pictures previously recorded or photographed on one or a number of frames of the filmstrip 4 in the factory.

After the data writing in the IC memory 8, a label is put around the cartridge shell 3, to complete the photo film cartridge 2. Then, a predetermined number of completed photo film cartridge 2 are loaded on a tray, and is transferred to a film unit assembly line.

In the film unit assembly line, DATA-A of the respective parts of the unit body 33 is temporarily written in a memory medium of a production information supervisory computer 10, such as a hard disc, while these parts are supplied to the film unit assembly line. DATA-A includes lens data, such as forming material, composition, focal length and f-number of the taking lens, and raw materials and colors of the front and rear housings 44 and 48 and those of the basic portion 45.

In a stage of assembling and inspecting the unit body 33, DATA-B is temporality written in the memory medium of the production information supervisory computer 10. DATA-B includes the shutter speed of the exposure unit 47, flashing characteristics of the flash unit 46, such as a guide number, voltage of the battery 49, set values and measured values of physical properties of the mechanisms, names of assembling machines and those of inspection machines, palette number, and so forth.

When the photo film cartridges 2 are supplied from the film cartridge assembly line to the film unit assembly line, the production information supervisory computer 10 first reads out DATA-D from the IC memory 8 of each photo film cartridge 2, and checks if DATA-A, B and C corresponds to the production plan data previously written in the production information supervisory computer 10. If not, the production information supervisory computer 10 gives a warning. If DATA-A, B and C corresponds to the production plan data, the photo film cartridge 2 is sent to a cartridge loading stage.

In the cartridge loading stage, the cartridge shell 3 and the film roll 4a are respectively put in the cartridge chamber 60 and the film roll chamber 61, and these chambers 60 and 61 are closed with the rear housing 48 light-tightly. This cartridge loading process is performed in a dark room. Thereafter, DATA-A and B are read out from the memory medium of the production information supervisory computer 10, and is written in the IC memory 8 through the terminal chip 68. Also, DATA-C relating to the cartridge loading process is written in the IC memory 8. DATA-C includes date and time of cartridge loading, production line number, machine number of a cartridge loading machine used, palette number, cartridge loading conditions. It is possible to write DATA-A, DATA-B and DATA-C in the IC memory 8 before loading the photo film cartridge 2 in the unit body 33.

In the next stage, the unit body 33 is subjected to different types of inspections, and DATA-E is written in the IC memory 8. DATA-E includes measurement values obtained during the inspections, such as actual shutter speed, data of flashing characteristics of the flash unit 46, physical properties of the mechanisms, power necessary to wind up the filmstrip 4, inspection line number, palette number, measurement head number, and so forth.

After passing the inspections, the photo film cartridge 2 is sent to a packing stage, wherein DATA-A, DATA-B, DATA-C, DATA-D and DATA-E are read out from the IC memory 8. The production information supervisory computer 10 determines the type of the unit body 33 based on the data read out from the IC memory 8. A plurality of wrapping lines for wrapping the unit body 33 with the outer cover 34 and packing lines for packing the film unit 32 in a gazette are provided for different types of unit bodies in the packing stage. The production information supervisory computer 10 compares the type of the unit body 33 with those printed on outer cover materials and packaging materials that are set in wrapping machines and packing machines of the different lines. To identify the unit body type printed on the wrapping materials and the packaging materials, the production information supervisory computer 10 reads bar codes on the labels and the packaging materials. Thus, an appropriate one of the labeling and packing lines is automatically chosen in accordance with the type of the unit body 33 supplied from the inspection stage, and the labeling and packing process is performed without intermission even when the film unit type to produce is switched over. This contributes to producing a large variety of film units at a lower cost.

Before the opening 44a for accessing the terminal chip 68 is closed by the outer cover 34, DATA-F is written in the IC memory 8. DATA-F includes date and time of packing, packing lot number, packing machine line data, packing condition data and so forth. Thereafter, the outer cover 34 is adhered to the unit body 33 to complete the film unit 32. The film unit 32 packed in the gazette is packaged a predetermined number in a corrugated cardboard box and shipped.

After the shipment, if a user of the photo film cartridge 2 files a complaint, like it takes too much power to wind up the film in the photo film cartridge 2, the photo film cartridge 2 is recovered and inspected. Before disassembling the unit body 33 for inspection, the outer cover 34 is removed to expose the terminal chip 68 through the opening 44a, and connect the IC memory 8 of the photo film cartridge 2 to a computer through the terminal chip 68, the flexible substrate 67, the plug 66 and the connector 65. Thus, the data written in the IC memory 8 is read out and is used for tracing production history of the film unit 32 to find out what is wrong with that film unit 32. If the cause of trouble is guessed based on the production history, the unit body 33 is disassembled to examine the suspicious portion while referring to the data read out from the IC memory 8. Accordingly, it is not always necessary to retrieve data from a huge database of the production information supervisory computer 10 in order to locate a trouble.

Although the embodiment shown in FIG. 8 uses the IC memory 8 of the photo film cartridge 2 for recording production control data of the film unit 32, it is possible to mount an IC memory in a portion or component of the unit body, e.g. on the printed circuit board of the flash unit. In that case, DATA-A and DATA-B may be written in the IC memory while the component with the IC memory is supplied to the assembling and inspection stage, and on the assembling and inspection stage respectively. DATA-D relating to the photo film cartridge 2 may be written in the IC memory on the cartridge loading stage.

The configuration to access the IC memory from the outside of the film unit 32 is not limited to that shown in the drawings. For example, it is possible to provide an opening with a lid at a position of the front housing facing to the connector 65, for a direct access to the connector 65. In that case, the plug 66, the flexible substrate 67 and the terminal chip 68 are omitted.

Figure 9:
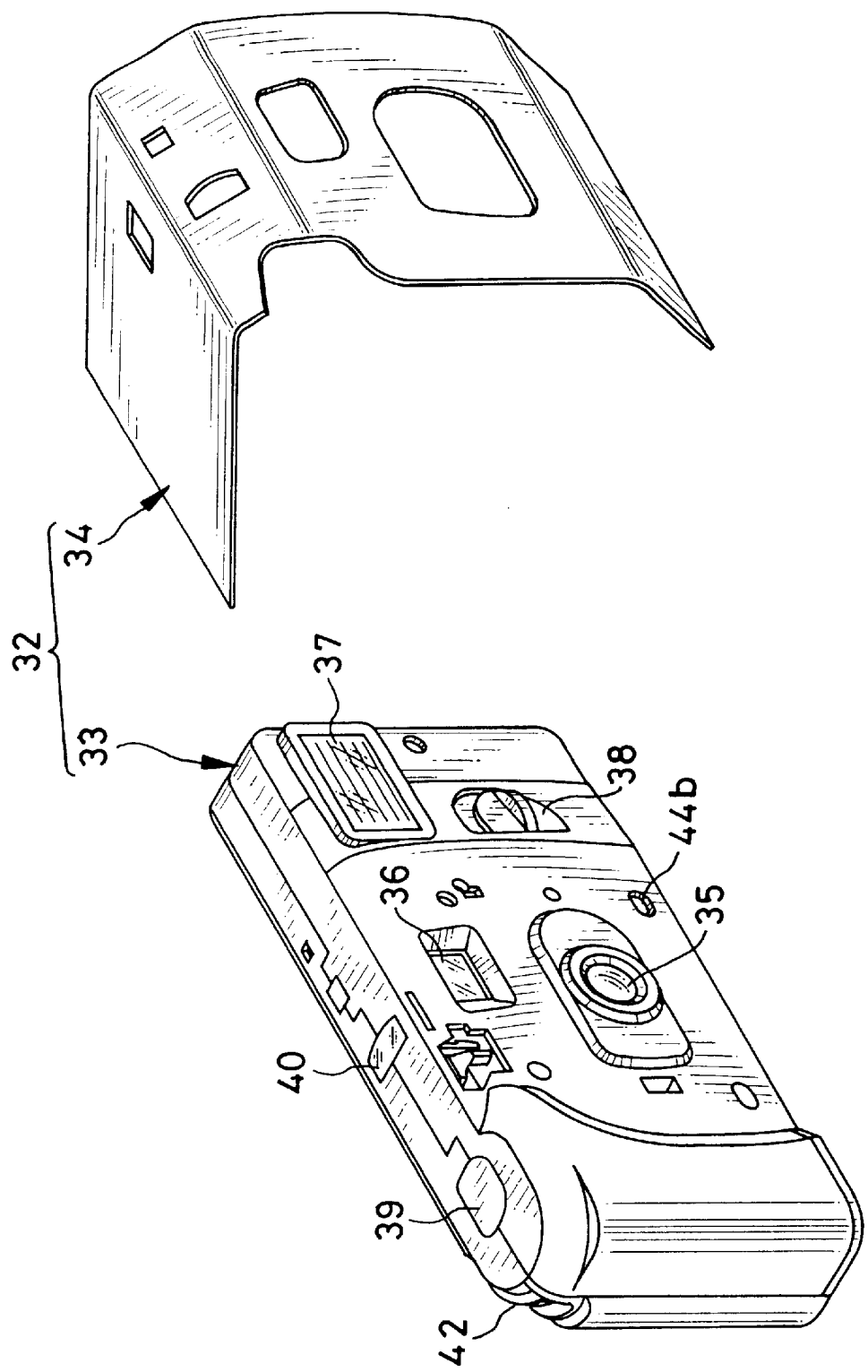
FIG. 9 is a perspective view of a unit body and an outer over of a lens-fitted photo film unit to be recycled according to a recycling method of the present invention.

FIG. 9 shows a film unit 32 according to another embodiment of the present invention useful for improving efficiency of recycling and reusing the film unit 32. The film unit 32 shown in FIG. 9 fundamentally has the same construction as the film unit 32 of FIG. 6. Therefore, the same or equivalent elements are designated by the same reference numbers, and the following description will relate to those configurations essential to this embodiment.

Figure 10:
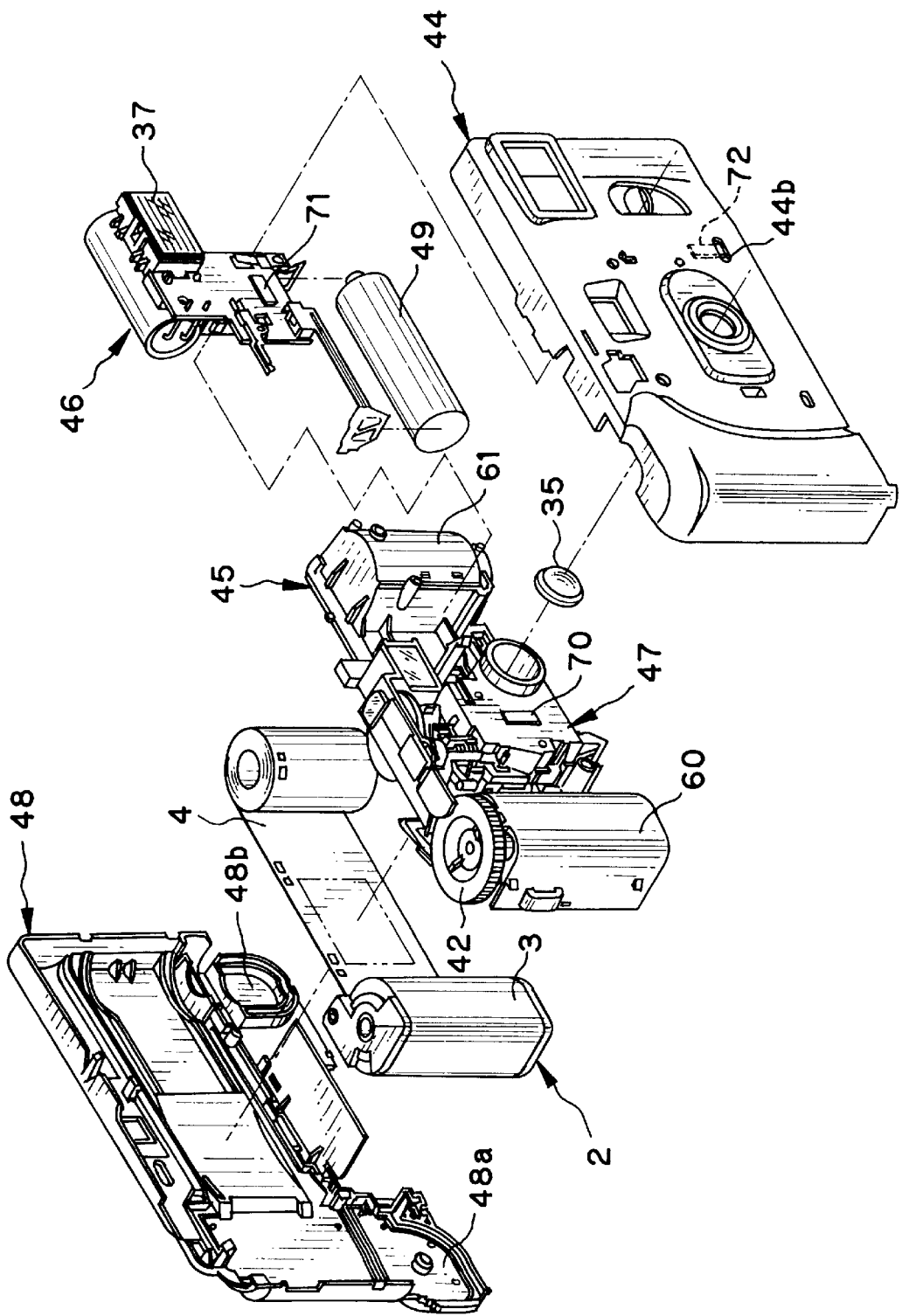
FIG. 10 is an exploded perspective view of the unit body of FIG. 9.

As shown in FIG. 10, IC memories 70, 71 and 72 are provided on an exposure unit 47, a flash unit 46 and a front housing 44 respectively. Contacts of the IC memories 70 and 71 are exposed to the outside of the exposure unit 47 and the flash unit 46, but are shielded by the front housing 44 in the assembled film unit 32. Data of parts or components of the exposure unit 47 and the flash unit 46, such as date of manufacture and name of manufacturer, is respectively written in the IC memory 70 and in the IC memory 71 during the manufacture. As set forth in detail later, quality control data detected to recycle or reuse the exposure unit 47 and the flash unit 46 is written in the IC memories 70 and 71. The quality control data includes use data indicating how many times it is reused, when it was allowed to reuse, and the like, as well as inspection data indicating results of inspections, and which parts are repaired, and the like.

The IC memory 72 is removably attached to the rear side of the front housing, and its contacts are exposed through an opening 44b formed through the front housing 44. Data of film unit type is written in the IC memory 72 through the contacts, and the opening 44b is closed by an outer cover 34.

The film unit 32 has a unit body 33 of substantially rectangular box shape, but there are different shapes of unit bodies according to the film unit type. There are many variations in shapes and positions of those elements exposed to the outside, such as a taking lens 35, a shutter button 39, a film winding wheel 42 and a flash switch knob 38. The film speed and the number of available exposures of the filmstrip contained in the film unit are different between different film unit types. Also, there are different types of flash units and exposure units. Those film units which have different internal structures from each other can have the same outer appearance.

The film unit 32 after photographing all available picture frames is formed to a photo-lab as a whole. After a photo film cartridge containing a roll of exposed filmstrip 4 is removed for development and printing, the emptied film unit 32 is collected to a center for reusing or recycling the parts of the unit body 33. When being transferred to the center, different types of film units are gathered in the same container.

Figure 11:
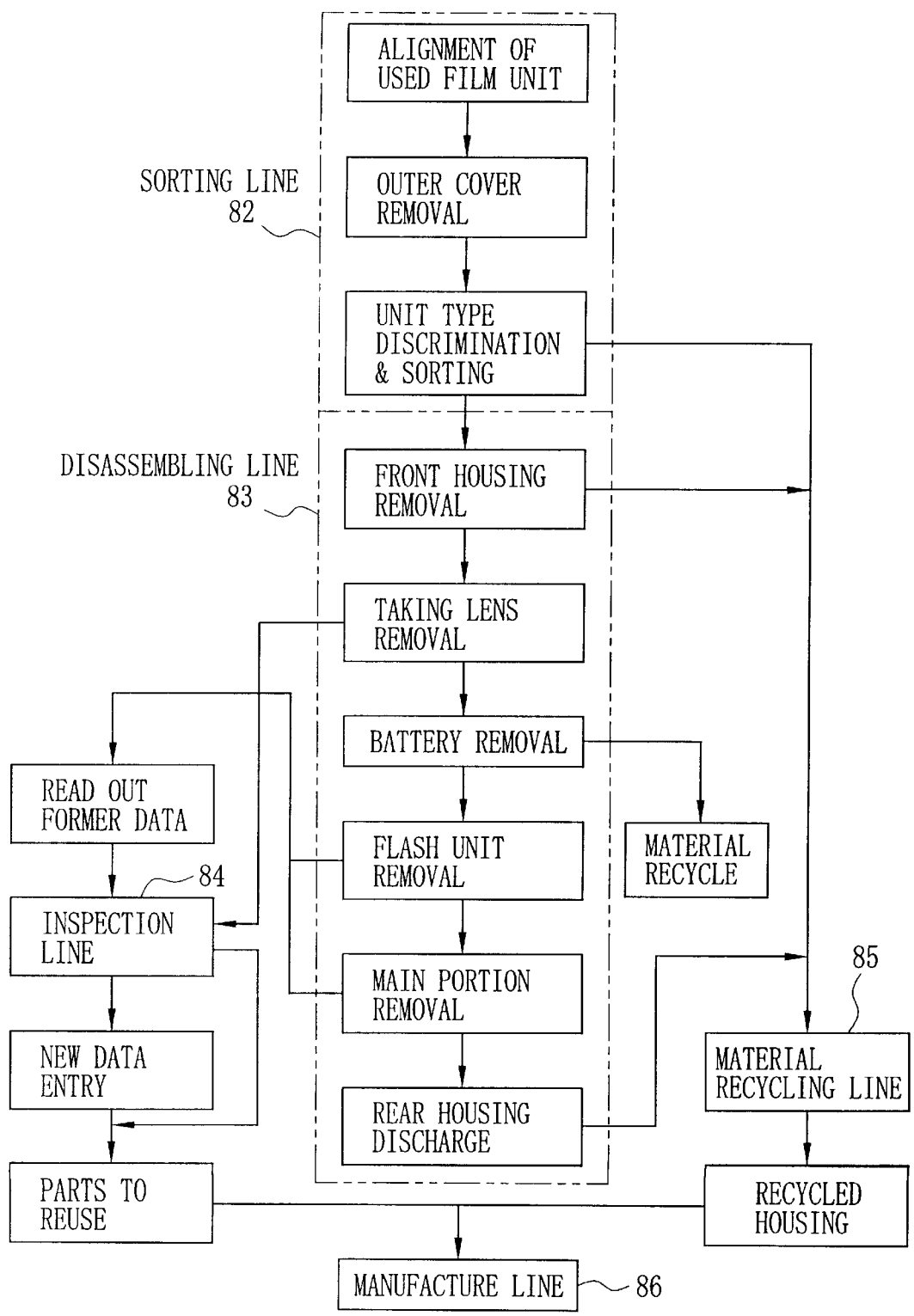
FIG. 11 is a functional block diagram illustrating the overall recycling process of the film unit.

FIG. 11 schematically shows reusing and recycling processes for the film units. The film unit 32 is first fed to a sorting line 82, wherein discrimination between different types of film units as well as between reusable ones and not is executed. The reusable film units are fed to a disassembling line 83, and parts or components of the film units are fed either to an inspection line 84 provided for each kind of reusable parts, or a material recycling line 85 for decomposing some parts, i.e. the front and rear housing 44 and 48 in this instance, into their raw material and forming new parts from the raw material.

The sorting line consists of a stage for aligning used film units into a line, a stage for removal of the outer cover 34, a stage for discrimination between different types of film units and a stage for sorting the film units, arranged in this sequence. In the alignment stage, film units supplied in different postures to the sorting line 82 are aligned in a line and put into the same posture. For example, an apparatus disclosed in U.S. Pat. No. 5,427,224 is used for aligning the film units in a line. The posture of each film unit is discriminated by a window setting method, wherein the profile of the film unit is detected as a black-and-white image on a monitor screen based on a light reflected from the film unit and received on an imaging device. After the posture is discriminated, the film units are sorted into four courses prepared for four postures: a predetermined right posture, an upside-down posture, a frontside-back posture, and an upside-down and frontside-back posture, and then those film units other than the right posture are corrected into the right posture in the respective courses, in the same way as disclosed in JPA 8-282837.

Thereafter, the film units of the right posture are aligned in a line again, and are conveyed to the outer cover removal stage to remove the outer cover 34 by cutting the outer cover 34 off the unit body 33. The unit body 33 is then sent to the unit type discrimination and sorting stage. The outer cover 34 removed from the unit body 33 is fed to a recycling line wherein the outer cover 34 is decomposed into a raw material, and a new outer cover is formed from the raw material and is used in a manufacture line 86.

Figure 12:
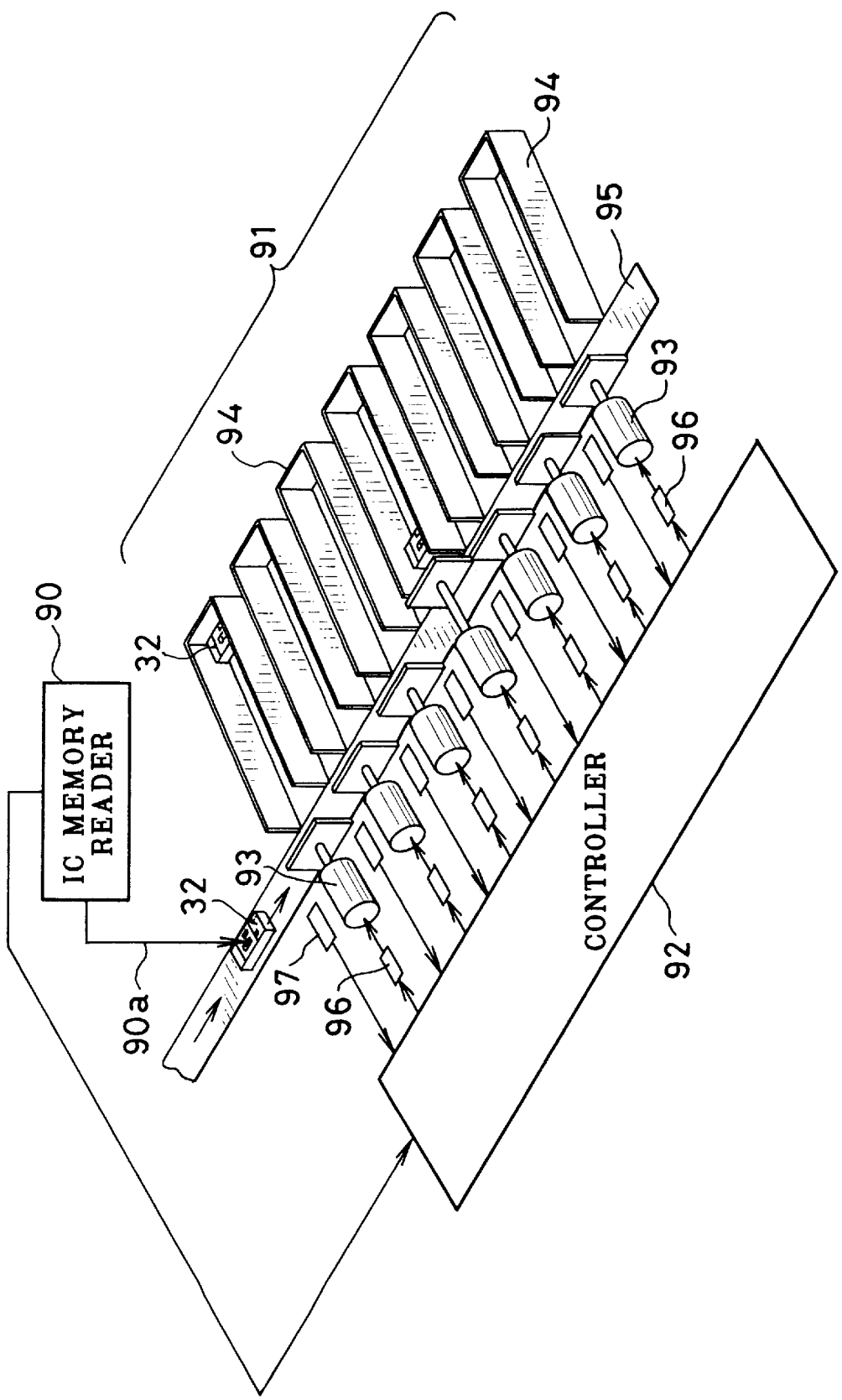
FIG. 12 is a schematic diagram illustrating a unit type discrimination and sorting stage on a sorting line.

In the unit type discrimination and sorting stage, the unit type data written in the IC memory 72 is read to be used for discriminating the type of the film unit 32. As shown in detail in FIG. 12, an IC memory reader 90, a unit sorting section 91 and a controller 92 are provided in this stage. The film unit 32 is fed into the IC memory reader 90 one by one with its taking lens 35 upside, and held at a reading position wherein terminals 90a of the IC memory reader 90 are brought into contact with the contacts of the IC memory 72 through the opening 44b. The unit type data read out by the IC memory reader 90 is sent to the controller 92.

The unit sorting section 91 consists of a plurality of discharging devices 93 and a corresponding number of storage rooms 94. The discharging devices 93 are arranged side by side along a conveyer 95. The discharging device 93 has an actuator, e.g. a solenoid, a cylinder or a motor, and is each individually movable in a crosswise direction of the conveyer 95 so as to push the film unit 32 out of the conveyer 95. The storage rooms 94 are arranged in opposition to the respective discharging devices 93 across the conveyer 95. Each discharging device 93 is assigned to one film unit type, so the same type of film units are accumulated in each storage room 94.

The controller 92 assigns each film unit 32 on the conveyer 95 to one of the discharging devices 93 according to the unit type data read out from the IC memory 72 of that film unit 32, tracks the film units 32 through sensors 97, such as photo sensors, that are arranged along the conveyer 95, and actuates each discharging device 93 through a driver 96 when the film unit 32 assigned to that discharging device 93 comes to the discharging device 93. After a predetermined number of film units 32 are accumulated in the assigned storage room 94, the film units 32 are transferred to a container while keeping the same posture, and are fed to the disassembling line provided for each unit type.

Through the disassembling line, consisting of a front housing removal stage, a taking lens removal stage, a battery removal stage, a flash unit removal stage, a main portion removal stage, and a rear housing discharge stage, the film unit 32 is disassembled into the front housing 44, the taking lens 35, the battery 49, the flash unit 46, main portions consisting of the basic portion 45 and the exposure unit 47, and the rear housing 48.

The front housing 44 is fed to the recycling line 85 for recycling the resin material, after the IC memory 72 is removed. The rear housing 48 is also fed to the recycling line 85. In the recycling line 85, the front and rear housings 44 and 48 are crushed into pellets, and new front and rear housings 44 and 48 from the pellets by metal molding. The IC memory 72 removed from the front housing 44 is reused after deleting the data written therein and being initialized and inspected on whether it is reusable or not.

The recycled front and rear housings 44 and 48 are supplied to the manufacture line 86. The front housing 44 is mounted with a new or initialized IC memory 72, and new unit type data is written in the IC memory 72.

The battery 49 is collected for material recycling or proper disposal. The flash unit 46, the taking lens 35, and the main portions consisting of the basic portion 45 and the exposure unit 46 are fed to the respective inspection lines 84. Those parts which pass through the inspection lines 84 are supplied to the manufacture line 86.

Figure 13:
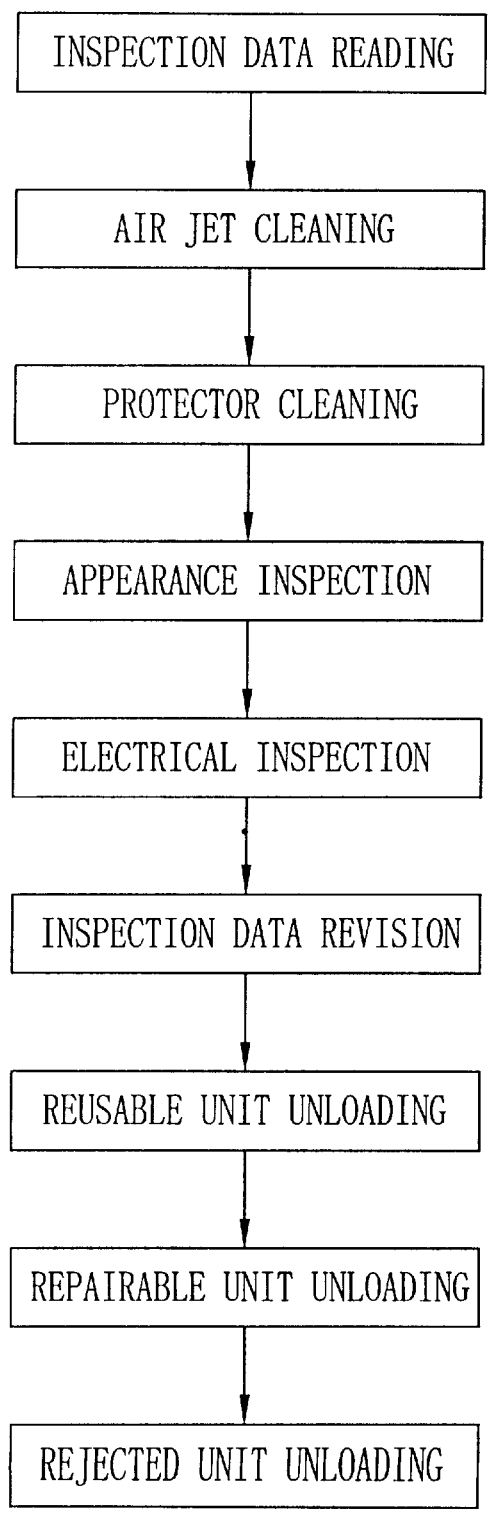
FIG. 13 is a flow chart illustrating the inspection process on an inspection line for reusable flash units.

FIG. 13 shows the overall inspection process for the flash unit 46 on the inspection lines 84. The flash unit 46 is conveyed on a pallet through the inspections. Before being inspected, the data written in the IC memory 71 is read out by an IC memory reader that has the same configuration as described with respect to FIG. 12. The flash unit 46 is placed on the pallet with its front side up so that the contacts of the IC memory 71 is oriented upward. The IC memory reader reads out the unit type data, the part data written during the manufacture, such as the date of manufacture and the name of the manufacturer of the respective parts, the quality control data detected and written during the previous inspections, including the use data and the inspection data. The data read out from the IC memory 71 is stored in a memory device, and is statistically summed up for use in managing information on the respective parts of the flash unit 46 and controlling the quality of the flash unit 46 and other purpose. Those flash units 46 whose IC memories 71 cannot be read are thrown away after the IC memories 71 are removed.

The use data is referred to for determining whether the flash unit 46 is reusable or not. Those flash units 46 which are disqualified for reuse according to the use data are thrown away after the IC memories 71 are removed. The removed IC memories 71 are reused after deleting the data written therein and being initialized and inspected on whether it is reusable or not.

Those flash units 46 which are determined to be reusable are subjected to an air jet cleaning wherein dust on the flash unit 46 is blown off by air jets, and then to a projector cleaning wherein an outer surface of a protector attached to the front of a flash projector 37 of the flash unit 46 is cleaned up by spraying detergent on the projector and wiping it by a cleaning head. Then, the flash unit 46 is subjected to an appearance inspection, wherein postures of the respective electric elements, scratches and stains on the protector surface, stains on a reflector of the flash projector 37, and deformation of the triggering switch, the indication lamp, the main capacitor and battery electrode plates are inspected.

Figure 14:
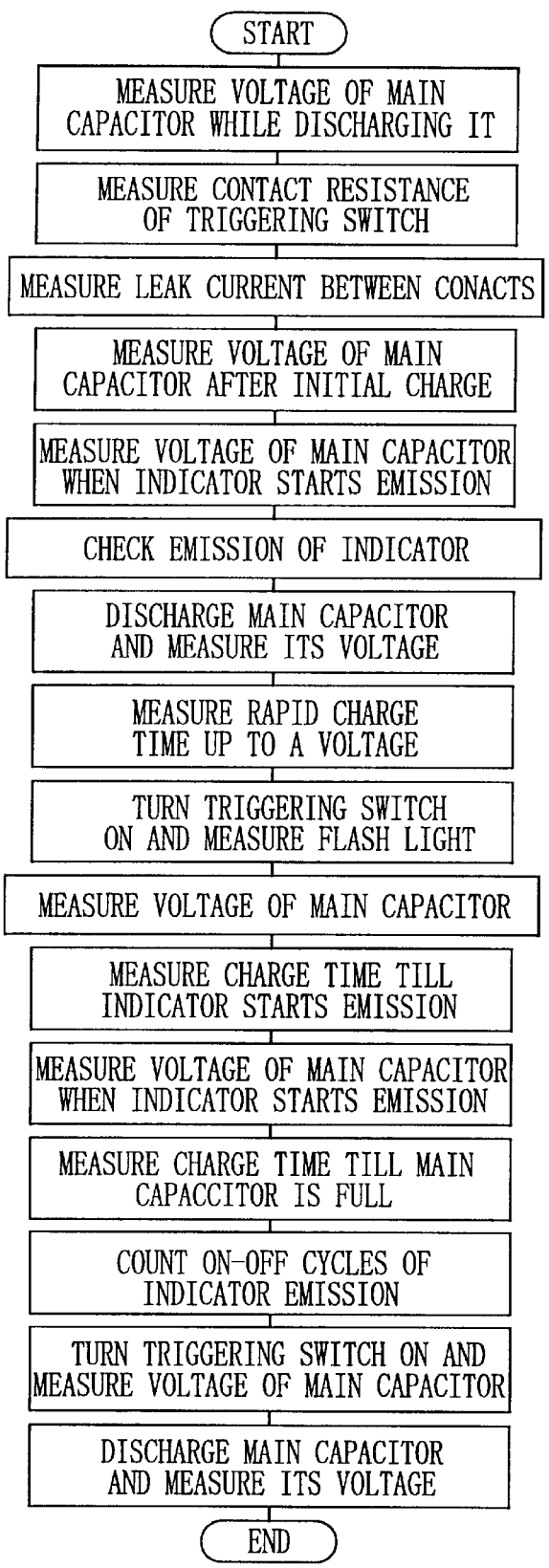
FIG. 14 is a flow chart illustrating an electrical inspection process for reusable flash units.

Thereafter, the electrical functions of the flash unit 46 is inspected according to a sequence as shown in FIG. 14. This sequence is substantially equal to that disclosed in the above mentioned U.S. Pat. No. 5,659,491. First, the main capacitor is discharged, while measuring the voltage thereof. If the voltage of the main capacitor does not go below a predetermined level, e.g. 2 V, within a predetermined time from the start of discharging, it is judged to be unacceptable. Then, contact resistance of the triggering switch is measured by turning on the triggering switch by use of an actuator. If the contact resistance is above a predetermined level, e.g. 2 $\Omega$, it is judged to be unacceptable. Next, leak current between battery electrode plates is measured while applying a test voltage, e.g. 1.6 V. If the leak current is 1 $\mu A$ or more, it is judged to be unacceptable.

Therafter, an initial charging of the main capacitor is performed with 1.6 V for a given time, e.g. 500 ms, and measure the voltage of the main capacitor. Unless the measured voltage is more than 30 V at that time, the flash unit 46 is disqualified. Continuously to the initial charging, a high D.C. voltage of 350 V is applied directly to the main capacitor for a rapid charging, to measure the time from the start of the rapid charging to the start of emission of the indicator lamp, as well as the voltage of the main capacitor at the start of the emission. Thereafter when the terminal voltage of the main capacitor eaches a set value, e.g. 270 V, the rapid charging is terminated, and a charging with 1.6 V is continued for 2 seconds, so as to determine if the indicaotr lamp continues to emit light. Next, the main capacitor is discharged for 100 ms, and then, the voltage of the main capacitor is measured. If the measured value is not less than a predetermined level, e.g. 230 V, the flash unit 46 is disqualified. Thereafter, the main capacitor is charged with the high D.C voltage for measuring the time from the start of charging to when the voltage of the main capacitor reaches a predetermined voltage, e.g., 220 V. If it is not less than 8 seconds, it is judged to be unacceptable.

Thereafter, the triggering switch is turned on for 10 ms to measure the amount of light projected from the flash projector 37, to determined if it reaches a predetermined level. The voltage of the main capacitor after the light projection is measured, and the flash unit 46 is disqualified if it is not less than 70 V. Then, the main capcitor starts to be charged again with 1.6 V, for checking if the indicator lamp starts emitting in a predetermined time, e.g. 8 seconds. If not, the flash unit 46 is disqualified. If the voltage of the main capacitor at the start of emission of the indicator lamp is not within a range, e.g. from 280 V to 310 V, the flash unit 46 is disqualified. The charging with 1.6 V is continued so as to check if the voltage of the main capacitor reaches a given voltage, e.g. 310 V, within a given time, e.g. 10 seconds, from the start of the charging. Simultaneously therewith, the number of ON-OFF cycles of the indicator lamp is counted. IF the cycle is not less than 17 counts per second, the flash unit 46 is disqualified.

Thereafter, the triggering switch is turned on again to effect flashing, and the voltage of the main capacitor after the flashing is measured. If it is not less than 70 V, the flash unit is disqualified. Finally, the main capacitor is discharged for a given time, e.g. 2 seconds. IF the voltage thereafter is not less than a given level, e.g. 5 V, the flash unit 46 is disqualified. The flash unit 46 successively goes through the above described processes as one cycle of electrical inspections.

Measurement data and judgement data obtained through the appearance inspection and those electrical inspections is transferred and stored as inspection data in a memory device of an inspection data revision stage. The memory device stores the inspection data of the respective inspection items by each flash unit 46. An IC memory writer is provided in the inspection data revision stage to read out the inspection data of each flash unit 46 and write it in the IC memory 71 of the corresponding flash unit 46. It is alternatively possible to provide an IC memory writer in each inspection process, and write the new inspection data in the IC memory 71 each time it is obtained.

Thereafter, the flash unit 46 is sent to a reusable unit unloading stage, wherein all the inspection data is read from the IC memory 71 to use for judging whether the flash unit 46 is acceptable for reuse. Those film units 46 which are qualified to be reusable are unloaded. Data indicating how many times the flash unit 46 has been reused is written in the IC memory 71 of the unloaded flash unit 46. It is possible to write the used time period in the IC memory 71 instead of the number of times of reuse. It is possible to determine the used time period according to the inspection data. Thereafter, the qualified flash unit 46 is supplied to the manufacture line 86.

Those flash units 46 which are not unloaded at the reusable unit unloading stage are sent to a repairable unit unloading stage, wherein the inspection data is read out from the IC memory 71 to use for determining whether the disqualified part or parts or functions of the flash unit 46 are repairable or not. If so, the flash unit 46 is unloaded as a repairable one. If not, the flash unit 46 is sent to a rejected unit unloading stage. The repairable flash units 46 are subjected to necessary repairment processes, and thereafter subjected to the inspection processes again.

The flash units 46 unloaded at the rejected unit unloading stage are thrown away after the IC memories 71 are removed. The removed IC memories 71 are initialized, and are reused after passing the writing test.

The main portions consisting of the basic portion 45 and the exposure unit 47 are inspected in twelve stages. In the first stage, the unit type data and the data of the parts written during the manufacture, as well as the use data and the inspection data detected and written during the previous inspections data is read out from the IC memory 70 incorporated into the exposure unit 46, and is stored in a memory device. The data stored in a memory device is statistically totaled for use in managing information on the respective parts of the main portions and for controlling the quality of the main portions. Those main portions whose IC memories 70 cannot read are thrown away after the IC memories 70 are removed.

The use data is referred to for determining whether the main portions are reusable or not. Those main portions which are disqualified for reuse according to the use data are thrown away after the IC memories 70 are removed. The removed IC memories 70 are reused after deleting the data written therein and being initialized and inspected on whether it is reusable or not.

In the second stage, dust and static electricity on the main portions are remove by an air jet cleaning and a destaticizing treatment. In the third stage, a door member operation mechanism for opening and closing the door member of the film cartridge 2 is set to an initial position, and the function of the door member operation mechanism is inspected in the fourth stage. The door member operation mechanism is reset to the initial position in the fifth stage. The finder optical system is washed in the sixth stage, and the shutter mechanism is cocked in the seventh stage. In the eight stage, the frame counter mechanism is set to an initial position. The shutter mechanism and the frame counter mechanism are inspected in the ninth and tenth stages respectively. In each stage, inspection data of each item is written in the IC memory 70 in place of the previously written data.

In the eleventh stage, the inspection data written in the IC memory 70 is read out for use in judging whether the main portions are reusable or not. If there is any data showing an unacceptable result among the inspection items, the main portions are disqualified. Only those main portions which are qualified to be usable are unloaded at the eleventh stage. The disqualified main portions are discharged at the twelfth stage. The number of times of reuse or the used time period is written in the IC memory 70 of the qualified main portions in place of the previous use data. Thereafter, the qualified main portions are accumulated and are supplied to the manufacture line 86. The disqualified main portions are subjected to necessary repairs and are inspected in the same way again.

Although the basic portion 45 and the exposure unit 47 are not separated and supplied as the main portions to the inspection line in the above embodiment, it is possible to separate the exposure unit 47 from the basic portion 45 and inspect only the exposure unit 47 for reuse. The parts for reuse or recycle are not limited to the above embodiment.

Also, the portions to provide IC memories are not limited to the above embodiment insofar as the IC memories are shielded from the outside of the film unit 32. For example, the IC memory 72 storing the unit type data may be mounted to the rear housing 48. Although the inspection data written in the IC memories 70 and 71 during the previous inspection is read after the disassembling, it is possible to read the IC memories on the internal parts when the outer cover 34 is removed, if only openings to access those IC memories are provided through the front housing 44 or the rear housing 48 according to the positions of the IC memories provided on the internal parts. Needless to say, such openings are closed by the outer cover 34. In addition to the unit type data, type data of a unit or an element, like the type of the exposure unit 47, may be written in the IC memory provided on that unit or element.

The IC memories may be of non-contact type. In that case, it is unnecessary to provide such an opening like the opening 44b for exposing the contacts of the IC memory, and the speed of reading and writing may be increased. In the above embodiment, power sources for the IC memories are provided in the IC memory readers. But it is possible to use IC memories having batteries as their own power sources therein. In that case, an inspection stage for checking the conditions of the batteries of the IC memories should be provided for changing those batteries which are running down with new ones.

Thus, the present invention is not to be limited to the above embodiment but, on the contrary, various modifications are possible without departing from the scope of appended claims.

What is claimed is:

1. A method of controlling production of a photo film cartridge comprising a cartridge shell, a roll of filmstrip contained in the cartridge shell, and an IC memory mounted to the cartridge shell thereof, the method comprising the steps of:
   writing data obtained in production process of the photo film cartridge in the IC memory; and
   reading data from the IC memory at later stages of the production process for use in controlling production of the photo film cartridge.

2. A method of controlling production of a photo film cartridge as claimed in claim 1, wherein data written in the IC memory includes film data of the filmstrip and production control data neccessary for production process of the photo film cartridge, a and the production control data and the film data are written in the IC memory before being mounted to the cartridge shell.

3. A method of controlling production of a photo film cartridge as claimed in claim 2, wherein n the filmstrip is wound into the cartridge shell after collating the film data with the filmstrip.

4. A method of controlling production of a photo film cartridge as claimed in claim 1, wherein data written in the IC memory includes measurement data obtained through functional inspections on the photo film cartridge.

5. A method of controlling production of a photo film cartridge as claimed in claim 1, wherein the IC memory is of non-contact type that needs not contact with one of a data reading and a writing device for one of reading and writing data.

6. A method of controlling production of a photo film cartridge as claimed in claim 1, wherein the data written in the IC memory during the production process is at least partly maintained stored in the IC memory after the photo film cartridge is completed.

7. A method of controlling production of a photo film cartridge as claimed in claim 6, wherein data is ciphered before being written in the IC memory.

8. A method of controlling production of a photo film cartridge as claimed in claim 6, wherein data written in the IC memory includes one of data necessary for recycling components of the photo film cartridge , and data necessary for environmental protection.

9. A method of controlling production of a photo film cartridge as claimed in claim 6, wherein data written in the IC memory includes data relating to a lens-fitted photo film unit when the photo film cartridge is to be loaded in the lens-fitted photo film unit.

10. A method of controlling production of a lens-fitted photo film unit comprising a unit body containing a photo film cartridge therein, and an outer cover wrapping the unit body, the method comprising the steps of:
   mounting an IC memory to the photo film cartridge before being loaded in the lens-fitted photo film unit;
   writing data obtained in a production process of the photo film cartridge in the IC memory;
   writing data obtained in a production process of the lens-fitted photo film unit in the IC memory after the photo film cartridge is loaded in the lens-fitted photo film unit, through an access device provided in the unit body for allowing to access the IC memory from outside the unit body; and
   reading data from the IC memory at later stages of the production process of the lens-fitted photo film unit for use in controlling production of the lens-fitted photo film unit.

11. A method of controlling production of a lens-fitted photo film unit as claimed in claim 10, wherein the access device is shielded from the outside by the outer cover that wraps the unit body.

12. A method of controlling production of a lens-fitted photo film unit as claimed in claim 11, further comprising a step of reading data from the IC memory through the access device for use in tracing a problem.

13. A method of controlling production of a lens-fitted photo film unit as claimed in claim 10, wherein data written in the IC memory includes unit type data representative of a type of the unit body, the unit type data being read out before the unit body is packed into packaging materials, including the outer cover, for collating the type of packaging materials with the type of the unit body.

14. A method of controlling production of a lens-fitted photo film unit comprising a unit body containing a photo film cartridge therein, and an outer cover wrapping the unit body, the method comprising the steps of:
   mounting an IC memory to at least a portion of the lens-fitted photo film unit;
   writing data obtained in production process of the lens-fitted photo film unit in the IC memory; and
   reading data from the IC memory at later stages of the production process of the lens-fitted photo film unit for use in controlling production of the lens-fitted photo film unit.

15. A method of controlling production of a lens-fitted photo film unit as claimed in claim 14, further comprising the step of providing the unit body with an access device for allowing access to the IC memory from outside the unit body, wherein data written in the IC memory includes unit type data representative of a type of the unit body, and the unit type data are read out from the IC memory through the access device before the unit body is packed into packaging materials, including the outer cover, for choosing a packing line proper for the type of the unit body.

16. A method of controlling production of a lens-fitted photo film unit as claimed in claim 15, further comprising a step of reading data from the IC memory through the access device for use in tracing a problem.

17. A method of recycling a lens-fitted photo film unit having a unit body containing a photo film cartridge therein and consisting of a plurality of components, the method comprising the steps of:
   writing at least unit type data representative of a type of the lens-fitted photo film unit in an IC memory that is provided at least one of the components, during a production process of the lens-fitted photo film unit;
   providing the unit body with an access device for allowing access to the IC memory from outside the unit body;
   reading the unit type data from the IC memory after the lens-fitted photo film unit is used and collected for recycling;
   sorting the lens-fitted photo film unit according to the type shown by the unit type data; and
   feeding the lens-fitted photo film unit to a disassembling line provided for the type of the lens-fitted photo film unit.

18. A method of recycling a lens-fitted photo film unit as claimed in claim 17, further comprising the steps of:
   writing part data relating to the one component in the IC memory;
   reading the part data from the IC memory;
   discriminating the type of the one component by the part data; and
   feeding the one component to either one of an inspection line for checking if the components are reusable, and to a material recycling line for recycling materials of the components, according to the type of the one component.

19. A method of recycling a lens-fitted photo film unit as claimed in claim 18, further comprising the steps of:
   writing in the IC memory inspection data obtained through the inspection line;
   reading the inspection data from the IC memory at the end of the inspection line; and
   determining based on the inspection data whether the one component is reusable.

20. A method of recycling a lens-fitted photo film unit as claimed in claim 19, further comprising the steps of:
   removing the IC memory from the one component if the one component is disqualified for reuse; and
   inspecting the IC memory for reuse.

21. A method of recycling a lens-fitted photo film unit having a unit body containing a photo film cartridge therein and consisting of a plurality of components, the method comprising the steps of:
   mounting an IC memory to each of those components which are expected to be reused during a production process of the lens-fitted photo film unit;
   inspecting each of the components to reuse, to determine whether it is reusable after the lens-fitted photo film unit is used and collected for recycling; and
   writing use data in the IC memory of one component as a record of reuse of the one component before reusing the one component to manufacture a second lens-fitted photo film unit, if the one component is qualified for reuse, wherein the use data is read out from the IC memory for judging whether the one component is reusable again when the second lens-fitted photo film unit is collected for recycling.

22. A method of recycling a lens-fitted photo film unit as claimed in claim 21, wherein the use data written in the IC memory of the one component is revised each time the one component is reused again.

23. A method of recycling a lens-fitted photo film unit as claimed in claim 22, further comprising the steps of:
   writing in each IC memory inspection data of each of the components to reuse, the inspection data being obtained through the inspections for reuse;
   determining based on the inspection data of each component to reuse whether the component is reusable.

24. A method of recycling a lens-fitted photo film unit as claimed in claim 23, wherein the inspection data is read out from the IC memory and is stored along with part data of each component in a memory for use in controlling quality of the lens-fitted photo film unit.

* * * * *